US008317977B2

(12) United States Patent
Black et al.

(10) Patent No.: US 8,317,977 B2
(45) Date of Patent: Nov. 27, 2012

(54) METHODS OF FORMING A REINFORCED PARCHMENTED NONWOVEN PRODUCT

(75) Inventors: Michael Dennis Black, Rossendale (GB); Alan Wightman, Berwick Upon Tweed (GB); Noël Cartier, Jardin (FR); Raymond Volpe, Wethersfield, CT (US); Julien Bras, Grenoble (FR); Carlos Vaca-Garcia, Toulouse (FR)

(73) Assignee: Ahlstrom Corporation, Helsinki (FI)

( * ) Notice: Subject to any disclaimer, the term of this patent is extended or adjusted under 35 U.S.C. 154(b) by 214 days.

(21) Appl. No.: 12/522,832

(22) PCT Filed: Jan. 10, 2008

(86) PCT No.: PCT/FI2008/050005
§ 371 (c)(1),
(2), (4) Date: Dec. 7, 2009

(87) PCT Pub. No.: WO2008/084139
PCT Pub. Date: Jul. 17, 2008

(65) Prior Publication Data
US 2010/0139877 A1    Jun. 10, 2010

Related U.S. Application Data

(60) Provisional application No. 60/884,686, filed on Jan. 12, 2007.

(51) Int. Cl.
*D21F 11/00* (2006.01)
(52) U.S. Cl. ..................... 162/146; 162/157.1
(58) Field of Classification Search .................. 162/146, 162/157.1, 141, 156, 157.2, 157.3, 157
See application file for complete search history.

(56) References Cited

U.S. PATENT DOCUMENTS

| | | | |
|---|---|---|---|
| 3,529,925 A | 9/1970 | Thomas et al. | |
| 3,617,200 A | 11/1971 | Gilder | |
| 4,883,709 A | 11/1989 | Nozaki et al. | |
| 5,009,747 A | 4/1991 | Viazmensky et al. | |
| 5,151,320 A | 9/1992 | Homonoff et al. | |
| 5,573,841 A | 11/1996 | Adam et al. | |

FOREIGN PATENT DOCUMENTS

| | | |
|---|---|---|
| GB | 1 471 576 | 4/1977 |
| WO | WO 2005/046312 | 5/2005 |

OTHER PUBLICATIONS

International Search Report for PCT/FI2008/050005, mailed Jun. 11, 2008.
Written Opinion of the International Searching Authority for PCT/FI2008/050005, mailed Jun. 11, 2008.

*Primary Examiner* — Mark Halpern
(74) *Attorney, Agent, or Firm* — Nixon & Vanderhye P.C.

(57) ABSTRACT

This specification is generally related to reinforced, parchmented paper, composite, reinforced parchmented paper and methods of manufacture thereof. The reinforced, parchmented paper may be used to form a sausage casing.

24 Claims, 13 Drawing Sheets

METHODS OF FORMING A REINFORCED PARCHMENTED NONWOVEN PRODUCT

This application is the U.S. national phase of International Application No. PCT/FI2008/050005 filed 10 Jan. 2008 which designated the U.S. and claims priority to U.S. Provisional Application No. 60/884,686 filed 12 Jan. 2007, the entire contents of each of which are hereby incorporated by reference.

FIELD

This specification is generally related to a method of forming a reinforced, parchmented nonwoven product and the product. In one embodiment the reinforced, parchmented material may be used to form a sausage casing.

BACKGROUND

Casing paper is commonly manufactured from wet laid paper webs of staple length, relatively strong, high-tenacity natural fibers, such as abaca, sisal or flax. The paper web is saturated with a dilute viscose solution. The cellulose in the viscose is then regenerated by passing the web through an acidic regenerating bath. The web is then washed free of acid and dried to produce a paper web impregnated with acid-regenerated cellulose. This casing paper is then generally formed into rolls ("master rolls"). Casings for the packaging of processed meats, e.g. sausage, may be manufactured from the casing paper by cutting it into strips, which are then folded and seamed to form tubes. The tubes are saturated with an alkaline viscose solution. The cellulose in the viscose is then regenerated by means of an acidic regenerating bath. The tube is then washed free of acid and salts. If desired, the tube may be passed through an aqueous bath that contains a plasticizer, e.g. glycerin, for the regenerated cellulose. The tube is dried by passing it through a heated chamber (the tube being in an inflated state) to give a cellulosic film tubing which has embedded therein a cellulose paper web. This tubing is typically stuffed with a processed meat product under pressure. The purpose in treating the initial paper web with the dilute viscose solution, followed by regeneration, is to provide the web with strength and structural integrity so that it may withstand the treatment with the highly caustic viscose solution used in the formation of the casing tubes. However, despite the initial treatment with dilute viscose, the treatment with the highly caustic, more concentrated viscose solution used in the formation of the casing tubes will inevitably entail a certain degree of softening and weakening of the web. Thus, despite a complicated multiple step treating process production difficulties may still be encountered during stuffing of the casing due to lower than desirable web strengths.

DEFINITIONS

Bicomponent fiber—fiber that has been formed by extruding polymer sources from separate extruders and spun together to form a single fiber. Typically, two separate polymers are extruded, although a bicomponent fiber may encompass extrusion of the same polymeric material from separate extruders. The extruded polymers are arranged in substantially constantly positioned distinct zones across the cross-section of the bicomponent fibers and extend substantially continuously along the length of the bicomponent fibers. The configuration of bicomponent fibers can be symmetric (e.g., sheath:core or side:side) or they can be asymmetric (e.g., offset core within sheath; crescent moon configuration within a fiber having an overall round shape). The two polymer sources may be present in ratios of, for example (but not exclusively), 75/25, 50/50 or 25/75.

Biconstituent fiber—A fiber that has been formed from a mixture of two or more polymers extruded from the same spinneret. Biconstituent fibers do not have the various polymer components arranged in relatively constantly positioned distinct zones across the cross-sectional area of the fiber and the various polymers are usually not continuous along the entire length of the fiber, instead usually forming fibrils which start and end at random. Biconstituent fibers are sometimes also referred to as multiconstituent fibers.

Calendering—the process of smoothing the surface of a nonwoven material by pressing it between opposing surfaces. The opposing surfaces include flat platens, rollers, rollers having projections and combinations thereof. Either or both of the opposing surfaces may be heated.

Cellulose fiber—A fiber comprised substantially of cellulose. Cellulose fibers come from manmade sources (for example, regenerated cellulose fibers or lyocell fibers) or natural sources such as cellulose fibers or cellulose pulp from woody and non-woody plants. Woody plants include, for example, deciduous and coniferous trees. Non-woody plants include, for example, cotton, flax, esparto grass, kenaf, sisal, abaca, milkweed, straw, jute, hemp, and bagasse.

Cellulose material—A material comprised substantially of cellulose. The material may be a fiber or a film. Cellulose materials come from manmade sources (for example, regenerated cellulose films and fibers) or natural sources such as fibers or pulp from woody and non-woody plants.

Conjugate fiber—Fiber that has been formed by extruding polymer sources from separate extruders and spun together to form a single fiber. A conjugate fiber encompasses the use of two or more separate polymers each supplied by a separate extruder. The extruded polymers are arranged in substantially constantly positioned distinct zones across the cross-section of the conjugate fiber and extend substantially continuously along the length of the conjugate fiber. The shape of the conjugate fiber can be any shape that is convenient to the producer for the intended end use, e.g., round, trilobal, triangular, dog-boned, flat or hollow.

Cross machine direction (CD)—The direction perpendicular to the machine direction.

Denier—A unit used to indicate the fineness of a filament given by the weight in grams for 9,000 meters of filament. A filament of 1 denier has a mass of 1 gram for 9,000 meters of length.

Extruded fiber—A fiber formed by extrusion of at least one thermoplastic polymer onto a surface. The extruded fiber can comprise at least one of fibers, filaments, bicomponent fibers, bicomponent filaments, biconstituent fibers and biconstituent filaments. The extruded web material is substantially free of cellulose materials.

Fiber—A material form characterized by an extremely high ratio of length to diameter. As used herein, the terms fiber and filament are used interchangeably unless otherwise specifically indicated.

Filament—A substantially continuous fiber. As used herein, the terms fiber and filament are used interchangeably unless otherwise specifically indicated.

Machine direction (MD)—The direction of travel of the forming surface onto which fibers are deposited during formation of a nonwoven web material.

Meltblown fiber—A fiber formed by extruding a molten thermoplastic material as filaments from a plurality of fine, usually circular, die capillaries into a high velocity gas (e.g., air) stream which attenuates the filaments of molten thermoplastic material to reduce their diameter. Thereafter, the meltblown fibers are carried by the high velocity gas stream and are deposited on a collecting surface to form a web of randomly dispersed meltblown fibers. Meltblown fibers are generally continuous. The meltblown process includes the melt-spray process.

Non-thermoplastic polymer—Any polymer material that does not fall within the definition of thermoplastic polymer.

Nonwoven fabric, sheet or web—A material having a structure of individual fibers which are interlaid, but not in an identifiable manner as in a woven or knitted fabric. Nonwoven materials have been formed from many processes such as, for example, meltblowing, spin laying, carding, air laying and water laying processes. The basis weight of nonwoven materials is usually expressed in weight per unit area, for example in grams per square meter ($gsm/g/m^2$) or ounces per square foot (osf). As used herein a nonwoven sheet includes a wetlaid paper sheet.

Polymer—A long chain of repeating, organic structural units. Generally includes, for example, homopolymers, copolymers, such as for example, block, graft, random and alternating copolymers, terpolymers, etc, and blends and modifications thereof. Furthermore, unless otherwise specifically limited, the term "polymer" includes all possible geometrical configurations. These configurations include, for example, isotactic, syndiotactic and random symmetries.

Regenerated cellulose—Manmade cellulose obtained by chemical treatment of natural cellulose to form a soluble chemical derivative or intermediate compound and subsequent decomposition of the derivative to regenerate the cellulose. Regenerated cellulose includes spun rayon and cellophane film. Regenerated cellulose processes include the viscose process, the cuprammonium process and saponification of cellulose acetate.

Spunlaid filament—A filament formed by extruding molten thermoplastic materials from a plurality of fine, usually circular, capillaries of a spinneret. The diameter of the extruded filaments is then rapidly reduced as by, for example, eductive drawing and/or other well-known spunbonding mechanisms. Spunlaid fibers are generally continuous with deniers within the range of about 0.1 to 5 or more.

Spunbond nonwoven web—Webs formed (usually) in a single process by extruding at least one molten thermoplastic material as filaments from a plurality of fine, usually circular, capillaries of a spinneret. The filaments are partly quenched and then drawn out to reduce fiber denier and increase molecular orientation within the fiber. The filaments are generally continuous and not tacky when they are deposited onto a collecting surface as a fibrous batt. The spunlaid fibrous batt is then bonded by, for example, thermal bonding, calendaring, chemical binders, mechanical needling, hydraulic entanglement or combinations thereof, to produce a nonwoven fabric.

Staple fiber—A fiber that has been formed at, or cut to, staple lengths of generally one quarter to eight inches (0.6 to 20 cm).

Synthetic fiber—a fiber comprised of manmade material, for example glass, polymer, combination of polymers, metal, carbon, regenerated cellulose, lyocell.

Substantially continuous—in reference to the polymeric filaments of a nonwoven web, it is meant that a majority of the filaments or fibers formed by extrusion through orifices remain as continuous nonbroken filaments as they are drawn and then impacted on a collection device. Some filaments may be broken during the attenuation or drawing process, with a substantial majority of the filaments remaining continuous.

Tex—A unit used to indicate the fineness of a filament given by the weight in grams for 1,000 meters of filament. A filament of 1 tex has a mass of 1 gram for 1,000 meters of length.

Thermoplastic polymer—A polymer that is fusible, softening when exposed to heat and returning generally to its unsoftened state when cooled to room temperature. Thermoplastic materials include, for example, polyvinyl chlorides, some polyesters, polyamides, polyfluorocarbons, polyolefins, some polyurethanes, polystyrenes, polyvinyl alcohol, copolymers of ethylene and at least one vinyl monomer (e.g., poly (ethylene vinyl acetates), and acrylic resins.

Vegetable Parchment (VP)—A paper made by treating a cellulose paper sheet with a gelatinizing agent comprising, for example, sulfuric acid under conditions where the reaction time between the gelatinizing agent and the cellulose is limited to control cellulose dissolution, hydrolysis and degradation. The treated paper is then washed thoroughly so as to remove the gelatinizing agent, after which it is dried. The bath chemical partially dissolves or gelatinizes the cellulose in the paper sheet. The dissolved cellulose is then precipitated when the bath chemical is diluted by washing the treated paper. This process, called parchmenting or parchmentising, forms a very tough, stiff, smooth paper with an appearance somewhat like that of a genuine parchment. Because paper treated in this manner has a tendency to become brittle and to wrinkle upon drying, it is frequently treated with a plasticizing agent, for example glycerin, glucose or Sorbitol. Vulcanized fiber is a related product made by treating a cellulose paper sheet with a gelatinizing agent comprising, for example, zinc chloride.

Waterleaf sheet—A wood pulp paper having a porosity advantageous for allowing fiber accessibility by a gelatinizing agent during parchmentising. A waterleaf sheet comprises fibers suited for dissolution by the gelatinizing agent, for example Eucalyptus fibers, Birch fibers or some annual plant fibers. Additives used in a waterleaf sheet are controlled to provide the desired fiber accessibility.

In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

SUMMARY

A first preferred embodiment of the present invention discloses a composite parchmented sheet, comprising a first nonwoven web of substantially continuous thermoplastic filaments and cellulose fibers entangled with the thermoplastic filaments, wherein the cellulose fibers have been parchmented.

A second preferred embodiment of the present invention discloses a composite parchmented sheet, comprising a first nonwoven layer comprising precipitated cellulosic material having an outer face and an inner face, a second nonwoven layer of substantially continuous thermoplastic filaments and cellulose fibers entangled with the thermoplastic filaments, the second layer having an inner face adjacent the first layer, filaments from the second layer being at least partially embedded in the precipitated cellulose of the first layer, wherein the layers are bonded together only by precipitated cellulose derived from the cellulosic fibers. Also, the cellulosic material is disclosed.

A third preferred embodiment of the present invention discloses a composite parchmented material suitable for the preparation of a casing material for the packaging of a food product, comprising a plurality of randomly oriented, substantially continuous thermoplastic filaments and cellulose fibers entangled with the thermoplastic filaments, wherein some portion of the cellulose fibers have been parchmented.

A fourth preferred embodiment of the present invention discloses a composite material suitable for the preparation of a casing material for the packaging of a food product, comprising a first nonwoven layer of substantially continuous thermoplastic filaments and cellulose fibers entangled with the thermoplastic filaments, the first layer having an inner face, and a second nonwoven layer comprising precipitated cellulosic material having an exterior face and an opposing inner face; wherein filaments are embedded within precipitated cellulose adjacent the second layer inner face and the layers are bonded together only by precipitated cellulose. The second layer can comprise cellulose fibers. The second layer can comprise a cellulose film. The first layer can comprise a spunlaid web with cellulose fibers entangled therein or a meltblown web with cellulose fibers entangled therein.

A fifth preferred embodiment of the present invention discloses a composite, reinforced precipitated product, comprising a nonwoven web of substantially randomly oriented, substantially continuous filaments having an inner face, a precipitated material partially surrounding some of the filaments adjacent the inner face and an exterior surface at least partially comprised of a thin dense layer of precipitated material. The composite, reinforced precipitated product can comprise cellulose fibers interposed between filaments of the first layer, wherein the precipitated material is precipitated cellulose. The composite, reinforced precipitated product can comprise a second layer in substantially continuous face to face contact with the first layer, wherein the first and second layers are bonded together only by the precipitated material.

A sixth preferred embodiment of the present invention discloses a method of forming a reinforced parchmented paper, comprising providing a first nonwoven web comprising substantially continuous thermoplastic polymer filaments; associating cellulosic fibers by entangling such with the first nonwoven web; immersing the entangled first web in a gelatinizing agent to partially gelatinize the cellulosic fibers; precipitating the gelatinized cellulose; and drying the first web.

A seventh preferred embodiment of the present invention discloses a method of forming a composite, reinforced parchmented paper, comprising providing a first nonwoven web comprising substantially continuous thermoplastic polymer filaments; entangling cellulosic fibers into the first nonwoven web; providing a second nonwoven web comprising cellulosic material; immersing at least one of the first and second webs in a gelatinizing agent to at least partially gelatinize the cellulosic fibers, the cellulosic material or both; overlying the first web onto the second web to form a composite treated material; precipitating the gelatinized cellulose; and drying the composite treated material to form the composite, reinforced parchmented paper, wherein the composite, reinforced parchmented paper comprises a layer of substantially continuous thermoplastic filaments and a layer of cellulose material bonded together by precipitated cellulose derived from the cellulosic fibers. Also, the cellulosic material is disclosed. The second web can be a cellulosic film.

The fiber reinforced, precipitated products disclosed herein can be used for numerous applications including, for example, backing sheets for sanding disks, baking pan liners, food wrappings and sausage casings.

BRIEF DESCRIPTION OF THE DRAWINGS

Referring now to the drawings wherein like elements are numbered alike in the several Figures.

DETAILED DESCRIPTION

Figure 1:
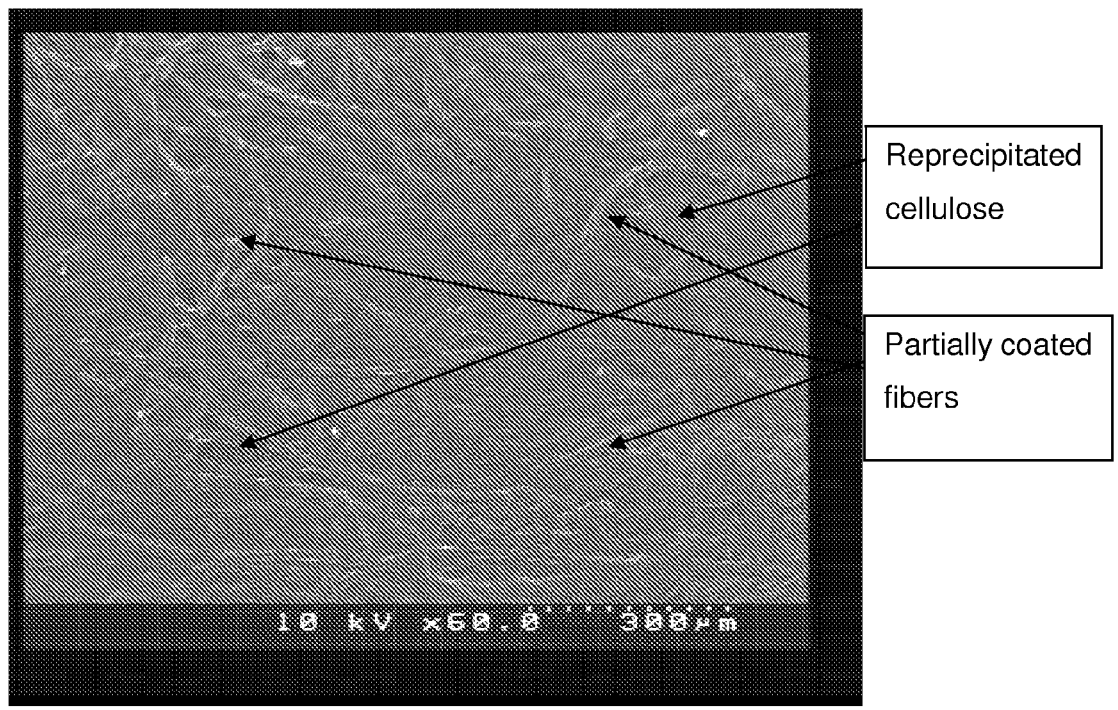
FIG. 1 is a micrograph of the top surface of a vegetable parchment (VP) sample.

In a preferred embodiment of the present invention a reinforced, precipitated, nonwoven product is prepared. The precipitated nonwoven product is prepared by treating a first fibrous, nonwoven base sheet with a gelatinizing agent to partially dissolve some of the material of that sheet. The partially dissolved material in the treated sheet is rearranged into the fibrous structure of the sheet and over the surface of the sheet. The dissolved material is precipitated to form the precipitated nonwoven product.

The base sheet may be comprised of one or more types of fibrous material including at least one fibrous material having a suitable sensitivity to a gelatinizing agent. For example, the sensitive fibers may comprise cellulose and the gelatinizing agent may comprise sulfuric acid; the sensitive fibers may comprise Chitosan and the gelatinizing agent may comprise acetic acid; the sensitive fibers may comprise nylon and the gelatinizing agent may comprise formic acid; the sensitive fibers may comprise polylactic acid (PLA) and the gelatinizing agent may comprise a PLA solvent. The base sheet may be comprised of a combination of fiber materials.

The reinforced precipitated product may typically have a thin dense layer of precipitated material at one or both surfaces. Between the thin dense surface layers the fibrous structure of the precursor base sheet may substantially remain with amorphous, precipitated material partially surrounding and bonding at least some of the fibers. The precipitated material at the surface may provide the reinforced precipitated product with a hard, low porosity surface.

In one variation of the invention the reinforced, precipitated, nonwoven product comprises a reinforced parchmented paper. The parchmented paper is prepared by treating a nonwoven base sheet comprising non-cellulose fibers and cellulose fibers with a gelatinizing agent. The partially dissolved cellulose fibers in the treated base sheet are rearranged into the sheet and over the surface of the sheet. The dissolved cellulose fibers are precipitated to form the reinforced parchment paper.

The non-cellulose fibers may be derived from a wide range of materials, for example glass, carbon, polyethylene terephthalate (PET), a mixture of polyethylene terephthalate polymers with similar or modified chemistries (for example CHDM (1,4-cyclohexanedimethanol) modified polyethylene terephthalate), polylactic acid (PLA), other polyesters such as polybutylene terephthalate (PBT) and poly trimethylene terephthalate (PTT), polypropylene (PP), polyethylene (PE), polyamide, copolymers of any of these polymers, mixtures of any of these polymers, Chitosan. The non-cellulose fibers are advantageously comprised of a thermoplastic polymer material and especially advantageously comprised of polypropylene or polyethylene terephthalate. The non-cellulose fibers may optionally contain one or more independently selected processing additives, including, for example, coloring pigments, opacifying pigments, functional additives such as a hydrophilic agents, antistatic agents and mixtures thereof. The non-cellulose fibers have a denier between about 0.1 and about 30. The shape of these fibers is typically round although they can be any shape that is convenient to produce for the intended end use, e.g., round, trilobal, triangular, dog-boned, flat or hollow. Cut fibers will have a length of less than 100 mm, advantageously less than 50 mm and typically in the range of about 4 mm to about 25 mm depending on use.

Typically, non-cellulosic fibers prepared from a thermoplastic polymer are extruded, for example spunlaid or meltspun, to form extruded filaments. The extruded filaments are formed in conventional fashion. The filaments can be collected and cut to form staple length fibers. Advantageously, the filaments are deposited on a moving forming surface to form a spunlaid batt of filaments extending substantially continuously in the movement (machine) direction. The batts can be bonded using any method suitable to maintain structural integrity in subsequent processes, for example, thermal point bonding or through air bonding. The bonded batt forms an extruded web material. In some advantageous embodiments the extruded web material is employed at basis weights of about 10 gsm to about 100 gsm and more advantageously at basis weights of about 20 gsm to about 50 gsm.

The cellulose fibers may be derived from a wide range of sources and include any cellulose containing fibers that exhibit a desirable degree of solubility in a gelatinizing agent. Examples of some suitable cellulose fibers include wood pulp fibers (including hardwood pulp, soft wood pulp and mixtures thereof), non-wood vegetable pulp fibers such as those derived from cotton, flax sisal, hemp, jute, esparto grass, bagasse, straw and abaca as well as regenerated cellulose fibers such as viscose or lyocell. Mixtures of various cellulose fibers may also be used. The cellulose pulp fibers, which may be used, include conventional short papermaking fibers, particularly having a fiber length of about 0.7 mm to about 25 mm and advantageously about 1.5 mm to about 5 mm. Conventional papermaking fibers include the conventional papermaking wood pulp fibers produced by the well-known Kraft process. Cellulose fibers advantageous for use in parchmentising include Eucalyptus, Birch, Red Cedar, Acacia, flax and linen. These fibers provide good accessibility to the gelatinizing agent at the fiber level as well as at the cellulose polymer level. It is believed that a cellulose degree of polymerization (DP) of less than 900 is advantageous.

In one variation of a reinforced parchment paper, staple length thermoplastic fibers and cellulose fibers can be mixed and a nonwoven base sheet is formed from this mixture, such as by the known wet papermaking process of depositing a dilute dispersion of fibers over a screen or wire. Fibers comprising other materials, for example rayon, may also be used in addition to the thermoplastic fibers and the cellulose fibers. Advantageously at least 40 percent of the fibers in the resultant base sheet are cellulose fibers.

In one variation of a reinforced parchment paper a nonwoven base sheet comprising staple length thermoplastic fibers is formed such as by carding. The nonwoven base sheet may also include other carded fibers, for example rayon fibers.

Cellulose fibers are applied to the base sheet. The cellulose fibers may be entirely, or substantially entirely, cellulose pulp fibers, and may advantageously be wood pulp fibers. Fibers comprising other materials, for example rayon, may also be applied to the carded sheet. Advantageously at least 40 percent of the fibers in the base sheet/cellulose fiber composite are cellulose fibers. The cellulose fibers may be applied to the base sheet as a pre-formed web or tissue or may be formed on the existing base sheet, for example by means of a wet-laying or air-laying process. Ways in which cellulose fibers may be applied to a base web material are disclosed in the U.S. Pat. Nos. 5,151,320 and 5,573,841, the contents of each of which are incorporated by reference herein. The choice of cellulose application process will typically be dependent on available process equipment. The cellulose will be applied in an amount of, in general, from about 10 gsm to about 80 gsm, advantageously from about 15 gsm to about 60 gsm and typically from about 15 gsm to about 30 gsm.

The applied cellulose fibers are associated with the base sheet to consolidate the base sheet/cellulose fiber composite for subsequent handling, for example by wet pressing the composite together or by entangling the cellulose fibers into the base sheet. Advantageously, the base sheet/cellulose fiber composite is subjected to a hydroentanglement operation, preferably a low to medium pressure hydroentanglement operation to form a nonwoven sheet. Hydroentanglement operations are described in U.S. Pat. Nos. 4,883,709 and 5,009,747, the disclosures of both of which are incorporated herein by reference. The hydroentanglement operation is preferably carried out by passing the base sheet/cellulose fiber composite under a series of fluid streams or jets that directly impinge upon the top cellulose-fiber-containing surface of the composite with sufficient force to cause a proportion of the cellulose fibers to be propelled into and entangled with the base sheet. The fluid jets are preferably jets of an aqueous liquid.

The total energy input provided by the fluid jets may be calculated by the formula.

$$E=0.125 YPG/bS$$

Wherein Y=the number of orifices per linear inch of manifold width, P=the pressure in psig (pounds per square inch gauge) of liquid in the manifold, G=the volumetric flow in cubic feet per minute per orifice, S=the speed of the composite sheet under the fluid jets in feet per minute and b=the basis weight of the resulting hydroentangled composite sheet produced in ounces per square yard. The total amount of energy, E, expended in treating the composite sheet is the sum of the individual energy values for each pass under each manifold, if there is more than one manifold and/or if there is more than one pass. In general, the total energy input is from 0.07 to 0.4 horsepower-hours per pound (HPhr/lb) (0.41 to 2.37 MJ/kg). Preferably, however, the total energy input is from 0.1 to 0.3 HPhr/lb (0.59 to 1.78 MJ/kg), more preferably from 0.12 to 0.28 HPhr/lb (0.71 to 1.66 MJ/kg). The entangled base sheet is dried, for example, over heated drying cans or in an oven.

In one advantageous variation of a reinforced parchment paper cellulose fibers are applied to an extruded web material base sheet to form a composite base sheet. Preferably the cellulose fibers applied to the extruded base sheet are entirely, or substantially entirely, cellulose pulp fibers, and more preferably wood pulp fibers. Fibers comprising other materials, for example rayon, may also be applied to the extruded base sheet. Advantageously at least 40 percent of the fibers in the extruded web/cellulose fiber composite are cellulose fibers. The cellulose fibers may be applied to the extruded base sheet as a pre-formed web or tissue or may be formed on the extruded base sheet, for example by means of a wet-laying or air-laying process. The choice of cellulose application process will typically be dependent on available process equipment. The cellulose will be applied in an amount of, in general, from about 10 gsm (gsm=g/m$^2$) to about 80 gsm, advantageously from about 15 gsm to about 60 gsm and typically from about 15 gsm to about 30 gsm.

The applied cellulose fibers are associated with the extruded base sheet to consolidate the material for subsequent handling. For example the base sheet/cellulose fiber composite can be wet pressed to or hydraulically entangled to associate the cellulose fibers into the extruded base sheet. Advantageously, the composite is subjected to a hydroentanglement operation, preferably a low to medium pressure hydroentanglement operation to form a nonwoven sheet. The hydroentanglement operation is preferably carried out with sufficient force to cause a proportion of the cellulose fibers to be propelled into and entangled with the base sheet. The fluid jets are preferably jets of an aqueous liquid.

Entanglement energy is dependent on basis weight and porosity of the base sheet. The higher the basis weight of the base sheet the higher the amount of energy needed to drive the cellulose fibers into that sheet. However, the energy input must not be so high as to blow cellulose fibers off the base sheet. In general, the total energy input is from 0.07 to 0.4 horsepower-hours per pound (HPhr/lb) (0.41 to 2.37 MJ/kg) (1 HPhr/lb=5.9 MJ/kg). Preferably, however, the total energy input is from 0.1 to 0.3 HPhr/lb (0.59 to 1.78 MJ/kg), more preferably from 0.12 to 0.28 HPhr/lb (0.71 to 1.66 MJ/kg). The entangled composite sheet is dried, for example, over heated drying cans or in an oven.

Typically the base sheet will not include binders and other additives. However, additives may be used to achieve specific desired results. For example, a thermosetting resin such as KYMENE available from Hercules Incorporated of Wilmington, Del., USA can be added to modify reactivity of the fibers in the base sheet to subsequent process operations, for example gelatinizing, or a wet strength agent might be advantageous to provide the wet base sheet with strength to endure subsequent operations without breaking or a filler such as $TiO_2$ may be added to modify opacity of the base sheet.

The basis weights (grammages; units g/m$^2$=gsm) of the resultant base sheet may be selected according to the fiber and/or filament constitution and the intended end use. In some advantageous embodiments the dried base sheet will have a basis weight of from about 20 gsm to about 180 gsm, more advantageously from about 30 gsm to about 100 gsm and preferably from about 35 gsm to about 70 gsm.

The base sheet or cellulose associated base sheet is parchmented by treatment with a gelatinizing agent. Some materials suggested for use as gelatinizing agents are aqueous solutions of alkalis, such as caustic soda; acids, such as sulfuric, phosphoric, nitric or formic; or acid salts of zinc, tin antimony or aluminum. Presently, sulfuric acid solutions are considered advantageous. The base sheet can be treated with a gelatinizing agent by passing it through a bath containing the gelatinizing agent, under predefined conditions of time and temperature. Suitable conditions for treating the base sheet with a gelatinizing agent are readily determined by a person skilled in the art.

Under normal conditions the gelatinizing agent is a mineral acid, advantageously sulfuric acid, in aqueous solution at a concentration of about 55 percent to 85 percent by weight and advantageously at a concentration of about 55 percent to about 75 percent by weight. The treatment duration is typically from about 5 seconds to about 30 seconds and advantageously about 10 seconds to about 20 seconds. Sulfuric acid used as a gelatinizing agent is typically at a temperature of about −10° C. to about 25° C. and advantageously about −5° C. to about 15° C. The gelatinizing agent serves to partially dissolve or gelatinize portions of the cellulose fibers contacting the agent. Typically, no more than about 30 percent of the cellulose in the treated base sheet is dissolved by the gelatinizing agent.

As the treated base sheet is conveyed into, through and out of the bath it passes over and under material handling rolls. Passage of the treated base sheet over the rolls helps to smear or spread the gelatinized cellulose over the sheet surface and between the other fibers of the sheet. The treated base sheet may optionally be compressed, for example between calendar rolls if desired. The treated base sheet is then washed to remove the gelatinizing agent. The gelatinized cellulose is precipitated when the gelatinizing agent is diluted during washing. After washing the treated base sheet is dried to provide a reinforced parchmented paper.

The reinforced parchmented paper is advantageously treated with a plasticising agent to maintain or improve flexibility. One advantageous plasticising agent is glycerol used in an aqueous solution at from 10 to 30% wt/wt concentration, e.g. 15 to 25% wt/wt). Other plasticising agents such as glucose or sorbitol may also be useful.

The reinforced parchmented paper will typically have a layered structure with a thin dense layer of precipitated cellulose at one or both surfaces. The interior of the reinforced parchmented paper will retain most of the original fibrous structure of the precursor base web. Fibers from the base web will be partially or fully embedded within portions of the thin, dense surface layer. Amorphous, precipitated cellulose will partially surround and bond at least some of the interior fibers in the reinforced parchmented paper. The precipitated cellulose at the surface can provide the reinforced parchmented paper with a hard, low porosity surface.

In one embodiment it is believed that a composite, reinforced precipitated product can be prepared. The composite, reinforced precipitated product comprises a first nonwoven sheet overlying and bonded to a second nonwoven sheet.

These first and second nonwoven sheets may be comprised of any fibrous material having a suitable sensitivity to a gelatinizing agent. For example, the fibers may comprise cellulose and the gelatinizing agent may comprise sulfuric acid; the fibers may comprise Chitosan and the gelatinizing agent may comprise acetic acid; the fibers may comprise nylon and the gelatinizing agent may comprise formic acid; the fibers may comprise polylactic acid (PLA) and the gelatinizing agent may comprise a PLA solvent. The first and/or second nonwoven sheets may be comprised of a combination of fiber materials. Alternatively, at least one sheet can be a nonfibrous film such as nylon or cellophane also having a suitable sensitivity to a gelatinizing agent. It should be noted that the terms first and second are used only for clarity and are not meant to limit the disclosure.

The composite, reinforced precipitated product may be prepared by treating one or both sheets with a gelatinizing agent to partially dissolve some of the fibers in the treated sheet. The sheets may be overlaid before, during or after treating with a gelatinizing agent. The overlaid sheets are in substantially continuous face to face contact with gelatinized material at the interface of the sheets. The overlaid sheets are compressed together, for example between the conveyor rolls used to handle the sheet material, to form a composite treated material. The overlaid first and second sheets may optionally be more highly compressed, for example between calendar rolls, if desired. The composite treated material is then washed to remove the gelatinizing agent and regenerate the gelatinized material. After washing the composite treated material is dried to form a composite, reinforced precipitated material. The first and second sheets are bonded to each other by the previously gelatinized, and now precipitated, material. No extrinsic or additional adhesive is required to bond the first and second nonwoven sheets. It would be possible to overlay and attach one or more additional sheets to either or both of the first or second sheets to form a more layered composite, reinforced precipitated product.

The composite, reinforced precipitated product may typically have a layered structure with a thin dense layer of precipitated material at one or both surfaces. The interior of the reinforced precipitated product may retain most of the original fibrous structure of the precursor base web. Fibers from the base web may be partially or fully embedded within portions of the thin, dense surface layer. Amorphous, precipitated product from the dissolved fibers may partially surround and bond at least some of the interior fibers in the reinforced parchmented paper. The precipitated material at the surface may provide the composite, reinforced precipitated product with a hard, low porosity surface.

In one variation the composite, reinforced precipitated product comprises a composite, reinforced parchmented paper comprising overlaid first and second nonwoven sheets is disclosed. The sheets may be overlaid at any time before, during or after treating with a gelatinizing agent.

This first nonwoven sheet can be a base sheet comprising a combination of non-cellulose fibers and cellulose fibers as described above. Advantageously, the first sheet is a composite base sheet comprising filaments extending substantially continuously in the machine direction to which cellulose fibers have been associated. The second nonwoven sheet can also be comprised of non-cellulose fibers and cellulose fibers as in the base sheets described above. Alternatively, the second nonwoven sheet can be a cellulose comprising sheet. Advantageously, the second nonwoven sheet can be a waterleaf sheet comprising substantially 100% cellulose fibers. In another advantageous variation the second nonwoven sheet comprises nonfibrous, cellulose film such as cellophane. It should be noted that the use of first and second is for clarity only and is not meant to limit the disclosure. It would be possible to overlay and attach one or more additional sheets to either or both of the first or second sheets to form a more layered composite, reinforced parchmented paper.

Typically the second sheet is treated with a gelatinizing agent such as sulfuric acid. The first sheet can be optionally treated with the gelatinizing agent depending on composition, either with the first sheet or independent of the first sheet. If the second sheet is a regenerated cellulose film it is currently considered advantageous to treat the first sheet with a gelatinizing agent and not treat, or minimally treat, the second sheet.

The overlaid sheets are compressed together, for example between the conveyor rolls used to handle the sheet material, to form a composite treated material. The overlaid first and second sheets may optionally be more highly compressed, for example between calendar rolls, if desired. The composite treated material is then washed to remove the acid or salt and regenerate the gelatinized cellulose. After washing the composite treated material is dried to form a composite, reinforced parchmented paper.

The composite, reinforced parchmented paper is advantageously treated with a plasticizing agent to maintain or improve flexibility. One advantageous plasticizing agent is glycerol used in an aqueous solution at from 10 to 30% wt/wt concentration, e.g. 15 to 25% wt/wt). Other plasticizing agents such as glucose or sorbitol may also be useful.

The composite, reinforced parchmented paper will typically have a layered structure with a thin dense layer of precipitated cellulose at one or both surfaces. The interior of the composite, reinforced parchmented paper will retain most of the original fibrous structure of the precursor base web and associated cellulose fibers. Some base web fibers will be partially or fully embedded within portions of the thin, dense surface layer. Amorphous, precipitated cellulose from the dissolved fibers can partially surround and bond at least some of the interior fibers in the composite, reinforced parchmented paper. The precipitated cellulose at the surface can provide the composite, reinforced parchmented paper with a hard, low porosity surface. The first and second sheets are bonded to each other by the previously gelatinized, and now precipitated, cellulose. No extrinsic or additional adhesive is required to bond the first and second nonwoven sheets.

In one embodiment a sheet, for example as described above, is formed into a tube and the edges are joined. The tube is treated with a gelatinizing agent such as sulfuric acid to gelatinize some of the cellulose in the tube. The treated tube is subsequently washed to regenerate the gelatinized cellulose and dried while in the tubular state to provide a tubular product suitable for the packaging of processed foods, e.g. sausage.

In one embodiment the above parchmented papers are used to prepare tubular casings for use in the packaging of processed foods, e.g. sausage. The parchmented paper is cut into strips, which are then folded to form tubes. The sides of the strips forming the tube are fastened such as by bonding or sewing or folding and crimping to form a seam. The casings are stuffed with food products under pressure and the ends are closed to seal the stuffed food product within the casing.

Various auxiliary treatments may be carried out, according to the desired end product, on any of the above described products. The treatment of the parchmented sheet with glycerol or the like in order to improve the flexibility of the sheet has already been mentioned. It is also possible to treat the sheet to modify adhesion of food product to the sheet, for example treatment to improve adhesion of meat product to the sheet or improve release of baked products to the sheet. The outside of the casing made from the sheet may be treated in order to improve adhesion, for example of printed matter. The surface of the sheet or the casing prepared therefrom may be modified by chemical grafting. Such treatments are known in principle in the art.

The gelatinizing agent treatment step is part of a series of possible steps, starting from the manufacture of a nonwoven fibrous web, treating the web with a gelatinizing agent, subjecting the web to chemical treatment, forming the web into a master roll, slitting the master roll to form a plurality of individual rolls, forming these rolls into tubes, sealing the transverse (overlapping) edges of each tube, printing the tube, coating the tube, and stuffing the tube with a food product, for example a processed meat product. Additions, deletions and variations in the sequence of steps are possible. Furthermore, the various steps do not have to be carried out one immediately after another. Additional layers may be used to provide a composite, precipitated product with desired properties.

Having generally described the invention, the following examples are included for purposes of illustration so that the invention may be more readily understood and are in no way intended to limit the scope of the invention unless otherwise specifically indicated.

Example 1

Reinforced Parchmented Paper

A number of samples from nonwoven sheets comprising cellulosic material entangled to a thermoplastic polymeric nonwoven web were prepared. Entanglement energies were in the range of 0.1 to 0.2 HPhr/lb. The composition of these samples is illustrated in Table 1.

TABLE 1

| | web material | | | entangled cellulose | | | Comp. sheet total basis |
|---|---|---|---|---|---|---|---|
| sample | type | pol. | basis wt. (gsm) | cellulose material | amount (gsm) | energy HPhr/lb | wt (gsm) |
| 1[1] | spunlaced | PET | 28 | wood pulp[3] | 40 | 0.12 | 68 |
| 2[2] | spunbond | PP | 20 | wood pulp[3] | 60 | 0.15 | 80 |
| 3[2] | spunbond | PP | 17 | wood pulp[3] | 37 | 0.10 | 54 |
| 4[2] | spunbond | PP | 17 | wood pulp[3] | 70 | 0.07 | 87 |
| 5[4] | spunlaced | PET | 20 | wood pulp[3] | 20 | 0.07 | 40 |
| 6[4] | spunlaced | PET | 20 | wood pulp[3] | 40 | 0.07 | 60 |
| 7[4] | spunlaced | PET | 20 | wood pulp[3] | 20 | 0.14 | 40 |
| 8[4] | spunlaced | PET | 20 | wood pulp[3] | 20 | 0.12 | 40 |

[1]This web material comprised a carded nonwoven web of staple length thermoplastic fibers.
[2]These web materials comprised a spunbond web of substantially continuous thermoplastic fibers.
[3]A mixture of red cedar pulp and fir pulp.
[4]These web materials comprised a nonwoven web of staple length thermoplastic fibers.

Portions of samples 1, 2 and 3 were parchmented under laboratory conditions by exposure to 68% sulfuric acid at a temperature of 12° C. for 20 seconds. The portions were washed in tap water and plate dried at 105° C. Each portion had a length of 295 mm and a width of 209 mm before parchmenting. Shrinkage of these portions after parchmenting is shown in Table 2.

TABLE 2

| sample | length after parchmenting (mm) | shrinkage (%) | width after parchmenting (mm) | shrinkage (%) |
|---|---|---|---|---|
| 1 | 273 | 7.5 | 154 | 26.3 |
| 2 | 267 | 9.5 | 170 | 18.7 |
| 3 | 273 | 7.5 | 164 | 21.5 |

Additional portions of samples 2 and 3 were parchmented separately. These portions were parchmented in 68% sulfuric acid at 0° C. for two different dwell times, 15 seconds and 45 seconds. The parchmented samples subjectively felt like stiffer, crisper versions of the original sheet material. The diamond shaped thermal point bond pattern of the precursor extruded web material was not well filled in after parchmenting. There were no apparent shrinkage marks. Base weight of sample 2 went from 80 gsm before parchmenting to 86 gsm after parchmenting. Base weight of sample 3 went from 52 gsm before parchmenting to about 54 gsm after parchmenting. The increase in base weight may be attributable to some shrinkage of the samples.

Additional portions from sheet 1 were parchmented separately. These portions were parchmented in 68% sulfuric acid at −2° C. for two different dwell times, 15 seconds (samples 1-4) and 45 seconds (samples 5-8). Appearance of the samples was good with only a few fine pinholes. Base weight of this sample went from 68 gsm before parchmenting to about 73 gsm after parchmenting. The increase in base weight may be attributable to some shrinkage of the samples. Some physical properties were tested and are summarized in Tables 3 to 6.

TABLE 3

| parchmenting time | sec. | 15 | 45 | 0[1] |
|---|---|---|---|---|
| basis wt | gsm | 72.6 | 73.2 | 68 |
| dry MD Tensile | (N/m) | 3540 | 3888 | 4000 |
| MD elongation at break | (%) | 8.3 | 14.4 | 20 |
| dry CD Tensile | (N/m) | 967 | 1038 | 1100 |

TABLE 3-continued

| CD elongation at break | (%) | 13.2 | 30.6 | 90 |
|---|---|---|---|---|
| wet MD Tensile | (N/m) | 3588 | 3846 | 3000 |
| wet MD elongation at break | (%) | 20 | 22.7 | 26 |
| wet CD Tensile | (N/m) | 1071 | 1055 | 850 |
| wet CD elongation at break | (%) | 82.8 | 86.1 | 86 |

[1]this represents test results for a sample of sheet 1 with no parchmenting.

Example 2

Composite, Reinforced Parchmented Paper

Composite, reinforced parchmented papers were produced from overlaid first sheets and second sheets. For samples 9 to 16 the first sheets are each a spunbonded (spunlaid and calender bonded) web hydraulically entangled with a softwood pulp mixture comprising 30% red cedar pulp and 70% eucalyptus pulp. Hydraulic entanglement was done under the following conditions.

Profile N°1 200/300/500+800/800/800/500; entanglement energy of 0.19 HPhr/lb.

Profile N°2 200/300/500/800; entanglement energy 0.06 HPhr/lb.

Profile N°3 200/300/500+300/500/500/500; entanglement energy of 0.18 HPhr/lb.

The hydraulic entangling equipment used for these examples is limited to 4 banks of nozzles, so profiles 1 and 3 were achieved by passing the samples through the hydraulic entangling equipment twice. The numerical values, for example '200/300/500' reflect the liquid pressure P in psig (1 psig=0.0689 bar) in the manifolds of the hydroentangling equipment, i.e. first manifold has a pressure of 200 psig, followed by 300 psig, and then 500 psig. It is believed that there is no beneficial or deleterious effect in hydraulically entangling a web material in one pass as opposed to multiple passes.

For sample 17 the first sheet is a nonwoven web formed from carded synthetic staple length fibers and associated cellulose fibers. Sample 17 was not hydraulically entangled with additional cellulose fibers.

The top sheets used are a cellophane (regenerated cellulose) film, a 35 gsm waterleaf sheet (SS), a 45 gsm waterleaf sheet (SS) and a different 45 gsm waterleaf sheet (B).

TABLE 4

| | | | first (base) sheet | | | | second (top) sheet | |
|---|---|---|---|---|---|---|---|---|
| | | | extruded web material | | entangled cellulose | | | |
| sample | ID. | Pol. | basis wt gsm | material | basis wt gsm | profile N° | material | basis wt gsm |
| 9 | AB | PP | 40 | mixture[1] | 30 | 2 | cellophane | 30 |
| 10 | AB | PP | 40 | mixture[1] | 30 | 2 | SS | 35 |
| 11 | AB | PP | 40 | mixture[1] | 30 | 2 | SS | 45 |
| 12 | AC | PP | 42 | mixture[1] | 30 | 1 | cellophane | 30 |
| 13 | AC | PP | 42 | mixture[1] | 30 | 1 | SS | 35 |
| 14 | AC | PP | 42 | mixture[1] | 30 | 1 | SS | 45 |
| 15 | AD | PP | 25 | mixture[1] | 20 | 3 | SS | 35 |
| 16 | AD | PP | 25 | mixture[1] | 20 | 3 | SS | 45 |
| 17 | 1060 | none | 40 | none | | none | B | 45 |

[1]A mixture comprising 30% red cedar wood pulp and 70% eucalyptus wood pulp.

Physical Properties of the Individual Base and Top Sheets Before Parchmenting.

Physical properties of the individual base sheets, including entangled cellulose, before parchmenting are listed in the following table.

TABLE 5

| first sheet ref | AB | AC | AD | 1060 |
|---|---|---|---|---|
| basis wt (gsm) | 66 | 65 | 45 | 40 |
| thickness (μm) | 343 | 295 | 237 | 183 |
| Bulk (cm³/g) | 5.2 | 4.5 | 5.3 | 4.5 |
| PPS (ml/Min)[1] | >9999 | >9999 | >9999 | >9999 |
| Textest (ml/m²/s)[2] | 884 | 2110 | 1072 | 1080 |
| Absorption capability (%) | 246 | 312 | 220 | 586 |

[1]PPS refers to porosity or permeability measured by Tappi 555 pm −94.
[2]Textest refers to Air Permeability Test, which is utilized to assess the ability of an absorbent structure to circulation/exchange air. The basic principle of the test is to evaluate the resistance of an absorbent article to the passage of air. In this test, the volume (or amount) of air that flows through an article of given dimensions under standard conditions (of 23° C./50% RH) is measured. The instrument utilised for the test is: Air Permeabilimeter FX 3300 manufactured by TexTest AG Switzerland.

Physical properties of the individual top sheets before parchmenting are listed in the following table.

TABLE 6

| material | Top Sheet Material | | | |
|---|---|---|---|---|
| | cellophane | SS | SS | B |
| basis wt (gsm) | 29.4 | 35 | 45 | 45 |
| thickness (μm) | 19 | 57 | 78 | |
| Bulk (cm³/g) | .66 | 1.61 | 1.66 | |
| PPS (ml/Min) | 0.3 | 146 | 634 | |
| Textest (ml/m²/s) | — | — | 1.53 | |

The base sheets and top sheets SS and B were parchmented and laminated in a single operation. Each base sheet and each top sheet was passed through a gelatinizing bath of 72% sulfuric acid concentration at 11° C. for 5 seconds, drained for 5 seconds and overlaid and bonded for 10 seconds. The base and top sheets had a total gelatinizing agent contact time of about 20 seconds from impregnation (when cellulose dissolution starts) to washing (when cellulose dissolution stops).

Cellophane is sensitive to acid degradation if immersed in a parchmenting bath. Therefore, the cellophane film is not immersed in the bath with the base sheet. Rather, the base sheet is immersed in the parchmenting bath and the cellulose film is laminated to the impregnated base sheet after the base sheet was removed from the bath. The sequence of acid lamination is the base sheet is passed through a gelatinizing bath of 72% sulfuric acid concentration at 11° C. for 8 seconds, 4 seconds of base sheet draining, overlying the cellophane film on the soaked base sheet and 8 seconds of bonding. Close contact of the cellophane film and base sheet can be enhanced by pressing the sheets together with rollers before washing. All of the composite, reinforced, parchmented paper samples were washed under running tap water for 10 to 15 minutes, immersed into an aqueous 10 percent glycerin bath at room temperature for 20 seconds and dried on a plate dryer at 110° C. for 10 minutes.

TABLE 7

| composite reinforced parchmented paper made using cellophane film top sheet | | | |
|---|---|---|---|
| sample | | 9 | 12 |
| base sheet | | AB | AC |
| DL front side[1] | | 5 | 5 |
| DL back side | | 5 | 5 |
| Grammage | g/m² | 118 | 112 |
| thickness | μm | 260 ± 19 | 295 ± 5 |
| burst | KPa | 292 ± 37 | 327 ± 15 |
| PPS front side | ml/min | 1.78 ± 1.16 | 0.64 ± 0.18 |
| PPS back side | ml/min | 568 ± 78 | 1120 ± 192 |
| Textest back side | l/m²/s | 0.87 ± 0.05 | 3.28 ± 0.19 |
| CD tear (non woven method) | N | 25 | 104 |
| Dry CD elongation at break | % | 22.5 ± 4.7 | 36.2 ± 6.1 |
| Dry MD elongation at break | % | 20.8 ± 1.3 | 32.5 ± 3.1 |
| Dry CD elongation at fracture | | 14.1 ± 1.1 | 17.6 ± 3.1 |
| Dry MD elongation at fracture | | 17 ± 1.1 | 15.4 ± 1.5 |
| Dry CD tensile strength | N/m | 1460 ± 120 | 1610 ± 230 |
| Dry MD tensile strength | N/m | 3070 ± 60 | 2840 ± 170 |
| Dry CD young modulus | MPa | 177 ± 36 | 155 ± 24 |
| Dry MD young modulus | MPa | 310 ± 40 | 269 ± 26 |
| Soaked CD elongation at break | % | 36.2 ± 5.9 | 44.1 ± 8.4 |
| Soaked MD elongation at break | % | 30.8 ± 3.1 | 45.1 ± 4.7 |
| Soaked CD elongation at fracture | | 30.1 ± 3.8 | 23.3 ± 4 |
| Soaked MD elongation at fracture | | 24.9 ± 1.1 | 20.4 ± 3.6 |
| Soaked CD tensile strength | N/m | 1280 ± 170 | 1460 ± 120 |
| Soaked MD tensile strength | N/m | 2630 ± 220 | 2390 ± 440 |
| Soaked CD young modulus | MPa | 41 ± 3 | 92 ± 16 |
| Soaked MD young modulus | MPa | 95 ± 7 | 120 ± 17 |

[1]DL refers to the grease barrier properties of a product. See paragraph 0097 where the test table showing the grease barrier levels has been discussed.

Physical Properties of the Composite, Reinforced Parchmented Paper after Parchmenting.

TABLE 8

| composite reinforced parchmented paper made using 35 gsm fibrous top sheet | | | | |
|---|---|---|---|---|
| sample | | 10 | 13 | 15 |
| base sheet | | AB | AC | AD |
| DL front side | | 3 | 4 | 3 |
| DL back side | | 1 | 1 | 1 |
| Grammage | g/m² | 129 | 133 | 114 |
| thickness | μm | 255 ± 16 | 260 ± 20 | 197 ± 18 |
| burst | KPa | 237 ± 12 | 246 ± 14 | 206 ± 7 |
| PPS front side | ml/min | 1.23 ± 0.34 | 0.78 ± 0.14 | 0.76 ± 0.16 |
| PPS back side | ml/min | 608 ± 100 | 889 ± 271 | 127 ± 41 |
| Textest back side | l/m²/s | 0.98 ± 0.03 | 3.2 ± 0.3 | — |
| CD tear (non woven method) | N | 27 | 97 | 17 |
| Dry CD elongation at break | % | 17.3 ± 2.3 | 33.6 ± 7.5 | 16 ± 0.9 |
| Dry MD elongation at break | % | 12.7 ± 2.3 | 35.7 ± 7.6 | 13.2 ± 2 |
| Dry CD elongation at fracture | | 12.8 ± 1.5 | 11.8 ± 0.9 | 12.5 ± 1.2 |
| Dry MD elongation at fracture | | 6.5 ± 0.5 | 6 ± 0.2 | 6.9 ± 0.4 |
| Dry CD tensile strength | N/m | 1890 ± 100 | 2330 ± 500 | 1720 ± 120 |
| Dry MD tensile strength | N/m | 2940 ± 130 | 2920 ± 210 | 2640 ± 310 |
| Dry CD young modulus | MPa | 152 ± 34 | 118 ± 37 | 181 ± 28 |
| Dry MD young modulus | MPa | 379 ± 43 | 363 ± 35 | 359 ± 90 |
| Soaked CD elongation at break | % | 24.5 ± 4.3 | 35.2 ± 11.2 | 25.4 ± 5.1 |
| Soaked MD elongation at break | % | 9.6 ± 9.6 | 47.4 ± 6.5 | 33.3 ± 7.1 |
| Soaked CD elongation at fracture | | 18.3 ± 1.6 | 13.7 ± 1.1 | 15.9 ± 0.6 |
| Soaked MD elongation at fracture | | 8.1 ± 0.7 | 7.5 ± 0.5 | 7.8 ± 0.6 |
| Soaked CD tensile strength | N/m | 1340 ± 60 | 1650 ± 340 | 1050 ± 70 |
| Soaked MD tensile strength | N/m | 2020 ± 330 | 1960 ± 180 | 1680 ± 280 |
| Soaked CD young modulus | MPa | 36 ± 1 | 68 ± 13 | 39 ± 2 |
| Soaked MD young modulus | MPa | 118 ± 9 | 147 ± 17 | 133 ± 6 |

TABLE 9 composite reinforced parchmented paper made using 45 gsm fibrous top sheet

| sample | | 11 | 14 | 16 | 17 |
|---|---|---|---|---|---|
| base sheet | | AB | AC | AD | 1060 |
| DL front side | | 3 | 4 | 5 | 3 |
| DL back side | | 5 | 5 | 5 | 2 |
| Grammage | g/m² | 144 | 142 ± 4 | 119 ± 1 | 119 ± 3 |
| thickness | μm | 270 ± 10 | 299 ± 18 | 209 ± 12 | 169 ± 3 |
| burst | KPa | 282 ± 22 | 252 ± 12 | 252 ± 24 | 267 ± 19 |
| PPS front side | ml/min | 2.17 ± 1.1 | 1.97 ± 0.73 | 2.32 ± 1.24 | 1.69 ± 0.27 |
| PPS back side | ml/min | 771 ± 79 | 1227 ± 120 | 149 ± 11 | 33 ± 5 |
| Textest back side | l/m²/s | 1.16 ± 0.14 | 4.71 ± 0.35 | — | — |
| CD tear (non woven method) | N | 21 | 104 | 20 | 9 |
| Dry CD elongation at break | % | 13.5 ± 2 | 25.5 ± 6.7 | 12.8 ± 2.3 | 11 ± 0.5 |
| Dry MD elongation at break | % | 14.3 ± 2.4 | 38.6 ± 4.6 | 12.3 ± 1.2 | 6.4 ± 0.8 |
| Dry CD elongation at fracture | | 11 ± 0.4 | 9.8 ± 0.7 | 11.5 ± 0.2 | 11 ± 0.4 |
| Dry MD elongation at fracture | | 6.7 ± 0.6 | 6 ± 0.5 | 6.6 ± 0.4 | 6 ± 0.5 |
| Dry CD tensile strength | N/m | 2690 ± 210 | 2800 ± 410 | 2550 ± 220 | 3050 ± 190 |
| Dry MD tensile strength | N/m | 3530 ± 250 | 3460 ± 290 | 3370 ± 270 | 3320 ± 100 |
| Dry CD young modulus | MPa | 302 ± 84 | 263 ± 39 | 241 ± 44 | 679 ± 51 |
| Dry MD young modulus | MPa | 494 ± 67 | 404 ± 26 | 566 ± 82 | 1027 ± 76 |
| Soaked CD elongation at break | % | 21 ± 6.5 | 31.6 ± 7.1 | 23.6 ± 2 | 13.8 ± 0.6 |
| Soaked MD elongation at break | % | 28.3 ± 9.1 | 44.6 ± 8.3 | 39.8 ± 12.3 | 7.7 ± 0.3 |
| Soaked CD elongation at fracture | | 12.3 ± 0.7 | 10.6 ± 0.4 | 12.5 ± 0.4 | 13.6 ± 0.5 |
| Soaked MD elongation at fracture | | 8.2 ± 0.8 | 7.8 ± 0.3 | 8.3 ± 0.5 | 7.5 ± 0.3 |
| Soaked CD tensile strength | N/m | 1600 ± 100 | 1820 ± 420 | 1420 ± 70 | 1230 ± 100 |
| Soaked MD tensile strength | N/m | 2300 ± 230 | 2490 ± 580 | 2090 ± 260 | 1190 ± 80 |
| Soaked CD young modulus | MPa | 55 ± 3 | 54 ± 7 | 71 ± 6 | 74 ± 5 |
| Soaked MD young modulus | MPa | 115 ± 1 | 119 ± 15 | 131 ± 8 | 106 ± 7 |

With respect to test samples the front side is the "barrier side" of the composite material or the cellulose rich side where the cellulose waterleaf sheet is laid. The back side opposes the front side and is first sheet side of the composite material. When the front side is tested with the DL test, it means that solvent is applied front or precipitated cellulose side of the composite material.

For reference, some results for a 76.2 gsm commercially available fibrous casing material having a treatment to lessen stuffed meat cling are recited below. It should be noted that properties desired in a casing material will depend on the end use for that material. Thus, the following properties are a reference point for one type of conventional casing material desirable for particular applications.

TABLE 10

| (76 gsm commercial casing material) | |
|---|---|
| DL front side | 5 |
| DL reverse side | 5 |
| Dry CD Elongation at break % | 22.9 |
| Dry MD Elongation at Break % | 7.1 |
| Dry CD Tensile N/m | 3605 |
| Dry MD Tensile N/m | 4239 |
| Dry CD Youngs Modulus | 996 |
| Soaked CD Elongation at break % | 44.5 |
| Soaked MD Elongation at Break % | 22.9 |
| Soaked CD Tensile N/m | 2377 |
| Soaked MD Tensile N/m | 2274 |
| Soaked CD Youngs Modulus | 187 |

Grease Barrier Properties

Samples of various composite, reinforced parchmented papers were tested (DL test) to determine resistance of each combination to grease penetration. The DL test makes possible to quantify the grease barrier properties of a nonwoven web using the application of a coloured solvent. In the DL test a report paper (one side coated paper of 115 gsm available from Ahlstrom) is placed under the nonwoven web sample. The verso face of the nonwoven web sample is adjacent the recto face of the report paper. An excess of solvent (1% solution of "red Organol BS" comprising 10 g red Organol, 10 g $CaCl_2$ and 980 g turpentine) is applied to the nonwoven web sample and allowed to remain for 3 minutes on the nonwoven web sample. The solvent is wiped off of the nonwoven web sample. The verso face of the nonwoven web sample and the recto face of report paper are observed. The result is expressed according to the DL test table below.

| | DL test table | |
|---|---|---|
| value | Verso face of nonwoven web sample | Recto face of report paper |
| 5 | no point | no spots or stains |
| 4 | 4 points maximum | no spots or stains |
| 3 | several points | no spots or stains |
| 2 | indifferent[1] | 4 spots maximum |
| 1 | indifferent | several spots |
| 0 | indifferent | 1 to 2 spots from 5 to 20 mm length |
| −1 | indifferent | more than two spots from 5 to 20 mm length |
| −2 | indifferent | spots length higher than 20 mm |
| −3 | indifferent | total piercing through |

[1]The verso face is no longer monitored once a spot is observed on the report paper.

As a comparison, conventional, standard fibrous reinforced casing gives a 5 on the DL test, although other types of casing materials may have greater or lesser barrier properties.

A composite, reinforced parchment paper comprising a 45 gsm fibrous top sheet can provide DL grease barrier level of 5 with an appropriate base sheet. Samples comprising a cellophane film top sheet appear to provide equivalent or better resistance to grease penetration as samples comprising a 45 gsm fibrous top sheet, but with a lower basis weight (30 gsm instead of 45). Samples comprising cellophane top sheets provided impermeability on both the front and back sides. Composite, reinforced parchment papers comprising a cellophane film top sheet provide acceptable barrier performance for use as a casing material. Gelatinized fibrous top sheets, especially at the 45 gsm weight, can also provide acceptable barrier performance for use as a casing material, especially if use of cellophane is not desired.

Elongation Properties

Samples of various composite, reinforced parchment papers (base sheet and overlaid top sheet) were tested to determine elongation at break and elongation at fracture. Elongation at break is the maximum deformation of a sample before its rupture expressed in %. Elongation at fracture is measured when the top layer is broken. In both tests a tensile force is exerted on one sample extremity at a speed of 10 mm/min with the other sample extremity being fixed. The sample width is 15 mm and the sample length is 100 mm. Elongation testing is based on ISO standard 1924-2-1994 and is measured using a dynamometer. For all tests soaked results refer to testing using the same test conditions except that the sample is soaked for 10 minutes in a water bath maintained at room temperature before testing.

Generally, both dry and soaked elongation at fracture values decrease as the basis weight of the top layer increases. Thus for composite, reinforced parchment papers comprising fibrous top sheets, advantageous elongation values would tend to require a lower basis weight top sheet while advantageous barrier properties would tend to require a higher basis weight top sheet. For the composite, reinforced parchment papers comprising a 45 gsm top sheet it appears that elongations at fracture are very close whatever the base web grade, approximately 10 to 15%. The results for composite, reinforced parchment paper samples comprising a cellophane film top sheet are different from those of the fibrous top sheets. Samples comprising a cellophane film top sheet had very good elongation properties with the wet elongation at fracture approaching around 30% elongation (sample 9).

Tensile Strength Properties

Samples of various composite, reinforced parchment papers (base sheet and overlaid top sheet) were tested to determine tensile strength. Tensile strength is the limiting load of a nonwoven web sample subjected to a tensile force until its rupture. A tensile force is exerted on one sample extremity at a speed of 10 mm/min with the other sample extremity being fixed. The sample width is 15 mm and the sample length is 100 mm. The tensile test is based on ISO standard 1924-2-1994 and results are expressed in kN/m or N/m. For all tests soaked results refer to testing using the same test conditions except that the sample is soaked for 10 minutes in a water bath maintained at room temperature before testing.

A composite, reinforced parchment paper can have strength properties advantageous for use in a casing material. For composite, reinforced parchment papers comprising fibrous top sheets the dry tensile strength appears to increase with the increasing basis weight of the top layer. Composite, reinforced parchment papers comprising cellophane film top sheets (30 gsm) have similar strength properties to the composite, reinforced parchment papers comprising 30 gsm fibrous top sheet papers. Top sheet basis weight has less effect on the wet tensile strength of the composite paper than on the dry tensile strength.

Use of Composite Reinforced Parchmented Paper as a Casing Material

It should be noted that modulus properties, elongation properties and tensile strength properties can have different acceptable ranges depending on the type of meat being stuffed into the casing and at what point in the stuffing/curing/drying/stripping stage the property is desired.

Figure 19:
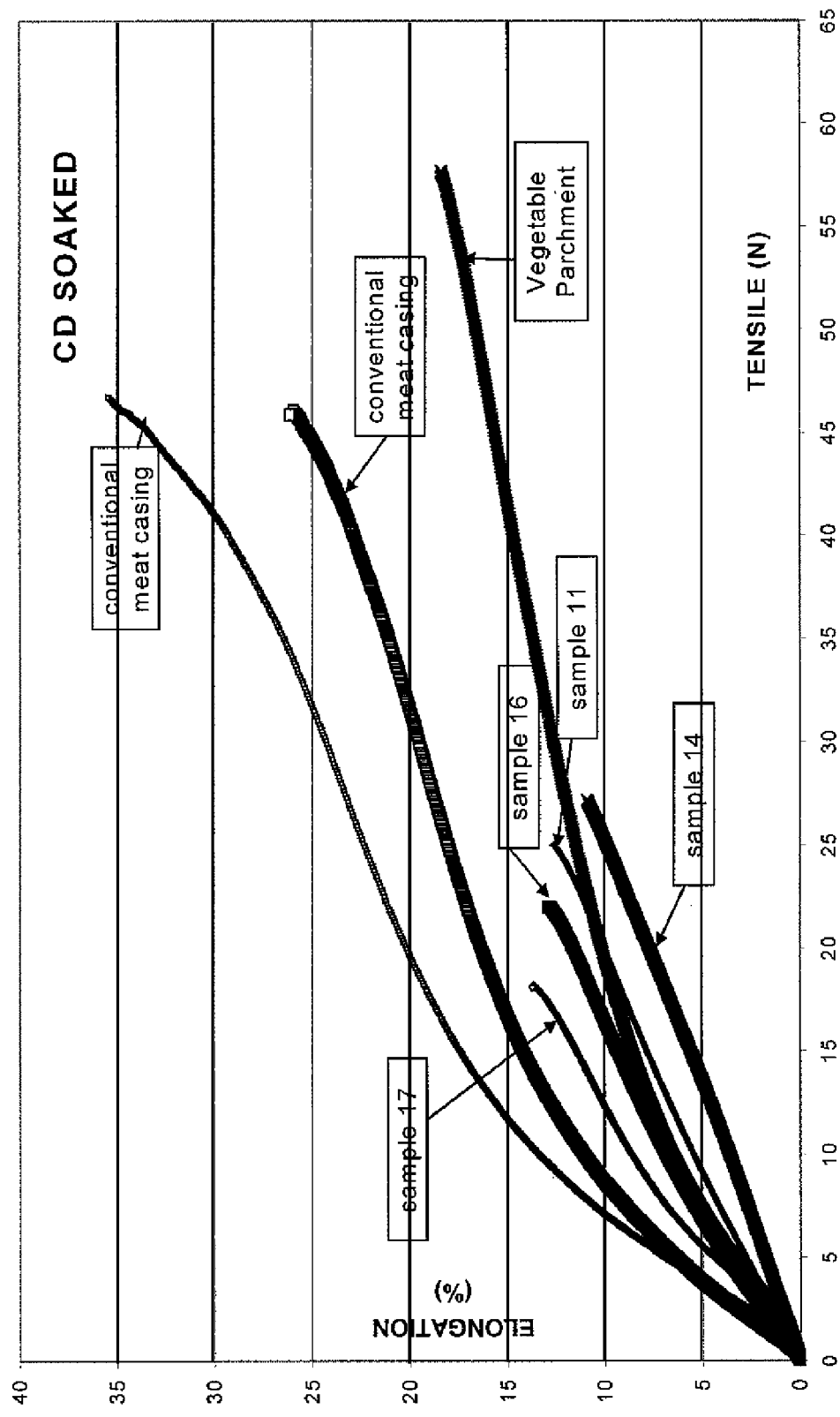
FIG. 19 is a graph of elongation versus tensile strength for some disclosed samples and some comparative products.

Some physical properties for various composite, reinforced parchment papers (base sheet and 45 gsm top sheet) are compared in FIG. 19. FIG. 19 shows that all curves are located close or even lower than the VP curve. The target window highlights the materials response to a low level of stress. FIG. 19 can be illustrative of these materials response during commercial sausage stuffing operation. Generally, all of samples 9 to 16 are stiffer than the conventional meat casings used as a comparison.

Figure 20:
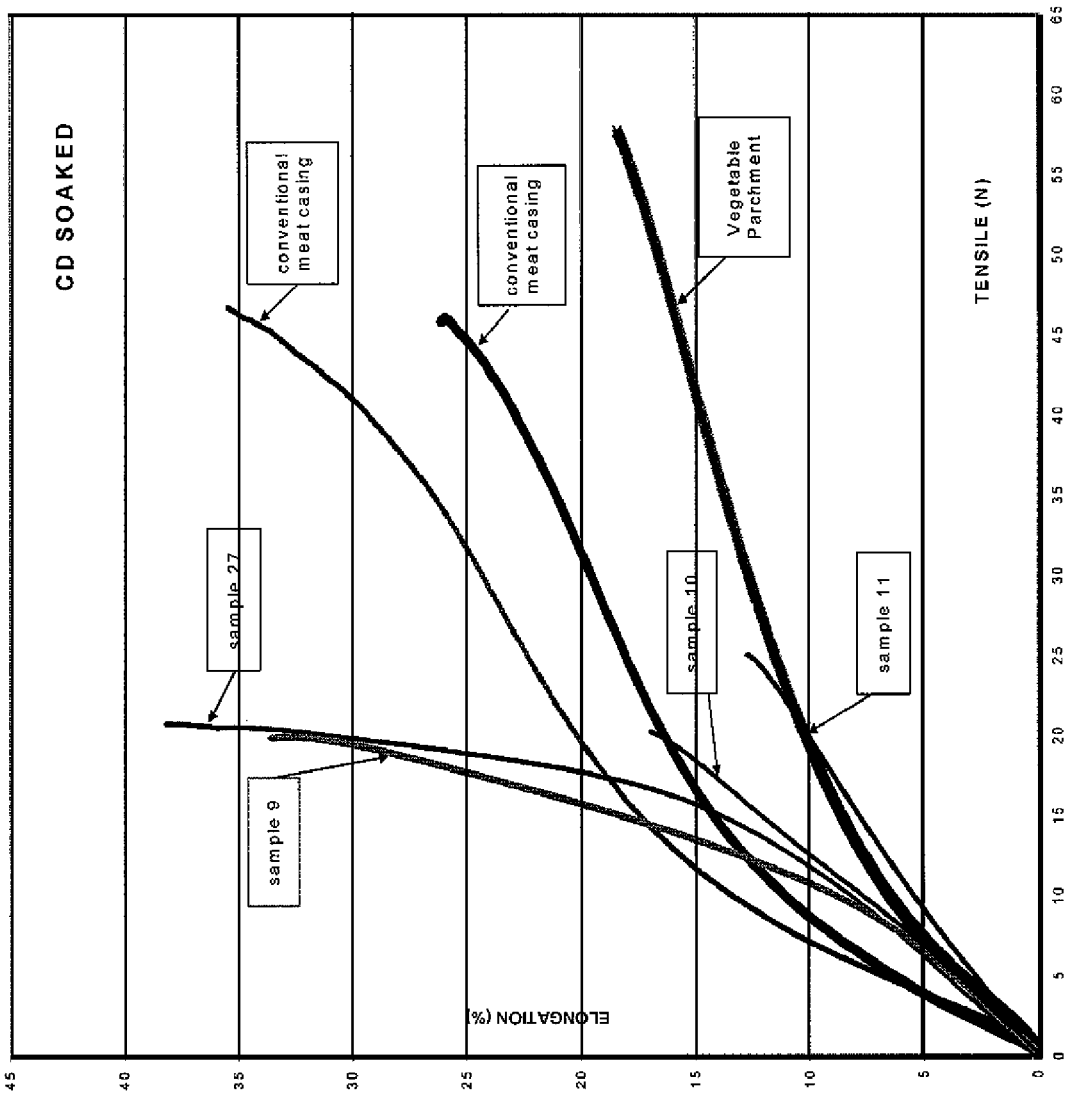
FIG. 20 is a graph of elongation versus tensile strength for some disclosed samples and some comparative products.
Figure 21:
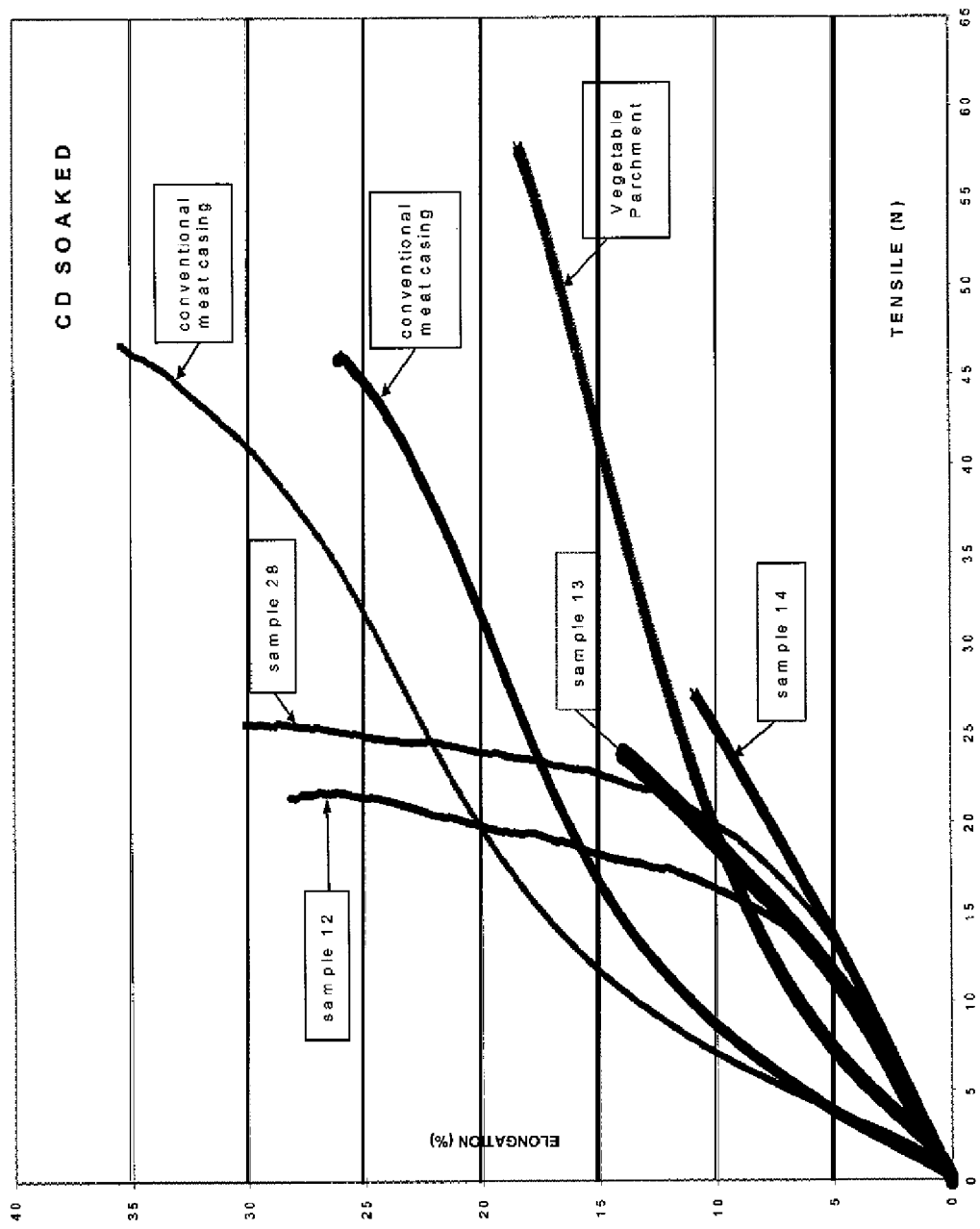
FIG. 21 is a graph of elongation versus tensile strength for some disclosed samples and some comparative products.
Figure 22:
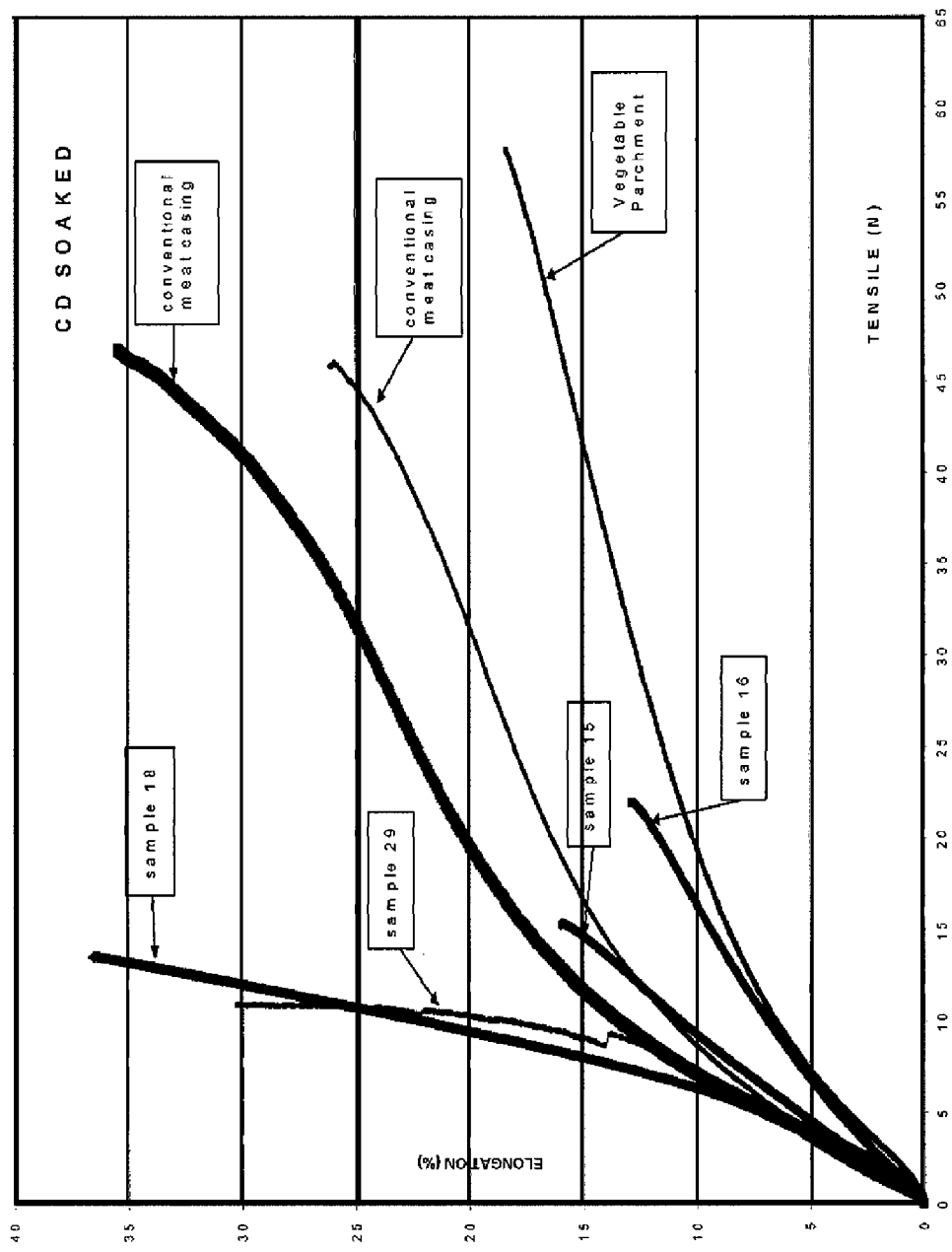
FIG. 22 is a graph of elongation versus tensile strength for some disclosed samples and some comparative products.

FIGS. 20 to 22 illustrate material behavior for composite, reinforced parchment papers comprising various base sheet/top sheet combinations. Elongation and strength properties are dependant on basis weight as highlighted on FIG. 20. As shown in FIG. 21 samples 12, 13 and 14 are stiff. As shown in FIG. 22 samples 15 and 16 show a good fit, especially sample 15 with a light 35 gsm top layer.

Example 3

Composite, Reinforced Parchmented Paper

Another composite, reinforced parchment paper (sample 18) was prepared using base sheet AD in combination with a cellophane film top sheet. The base sheet was spunbonded from substantially continuous polypropylene filaments and had a basis weight of about 25 gsm. About 20 gsm of wood pulp was hydroentangled into the base sheet according to profile N°3 (200/300/500+300/500/500/500); entanglement energy of 0.18 HPhr/lb. The top sheet was a 30 gsm cellophane film.

As previously discussed cellophane is sensitive to acid degradation if immersed in a parchmenting bath. Therefore, the cellophane film is not immersed in the bath with the base sheet in this Example. Rather, the base sheet is immersed in the parchmenting bath and the cellulose film is laminated to the impregnated base sheet after the base sheet was removed from the bath. The sequence of acid lamination are 8 seconds of base sheet immersion, 4 seconds of base sheet draining, overlying the soaked base sheet and cellophane film for 8 seconds of bonding. All of the composite, reinforced, parchmented paper samples were washed under the tap water for 10 to 15 minutes, immersed into an aqueous 10 percent glycerin bath at room temperature for 20 seconds and dried on a plate dryer at 110° C. for 10 minutes.

The cellophane film is partially gelatinized during the acid lamination procedure. After washing and drying the precipitated cellulose bonds the cellulose film to the base sheet. Physical properties for this composite reinforced parchmented paper sample are shown in the following Table.

TABLE 11

|  | unit | Sample 18 |
| --- | --- | --- |
| DL front side |  | 5 |
| DL back side |  | 2 |
| Grammage | g/m² | 98 ± 3 |
| thickness | μm | 200 ± 16 |
| burst | KPa | 268 ± 21 |
| PPS front side | ml/min | 2.4 ± 2 |
| PPS back side | ml/min | 139 ± 12 |
| dry CD elongation at break | % | 27.7 ± 4.5 |
| dry MD elongation at break | % | 16.6 ± 2.3 |
| dry CD elongation at fracture |  | 16.9 ± 1.5 |
| dry MD elongation at fracture |  | 13.4 ± 1.4 |
| Dry CD tensile strength | N/m | 1080 ± 200 |
| dry MD tensile strength | N/m | 2290 ± 150 |
| dry CD young modulus | MPa | 158 ± 44 |
| dry MD young modulus | MPa | 347 ± 36 |

TABLE 11-continued

|  | unit | Sample 18 |
| --- | --- | --- |
| soaked CD elongation at break | % | 44.6 ± 6.5 |
| soaked MD elongation at break | % | 31.7 ± 4.8 |
| soaked CD elongation at fracture |  | 37.4 ± 5 |
| soaked MD elongation at fracture |  | 24.1 ± 4.9 |
| Soaked CD tensile strength | N/m | 900 ± 160 |
| soaked MD tensile strength | N/m | 1830 ± 310 |
| soaked CD young modulus | MPa | 32 ± 4 |
| soaked MD young modulus | MPa | 91 ± 5 |

Elongation:

As a general result for all tested base webs, addition of cellophane film as top layer provides an increase in soaked CD elongation before fracture. This improvement is especially remarkable in the case of the sample 18, which reaches or exceeds the elongation value of conventional, fibrous meat casing of more than 37%.

Example 4

Composite, Reinforced Parchmented Paper

Further composite, reinforced parchmented paper samples were prepared. Sample 19 included a base web comprising a 40 gsm low elongation spunbond web (available from Don & Low as LS2787) entangled with 30 gsm of red cedar based wood pulp. The pulp was entangled using moderate pressure and an entanglement profile of 25, 36, 45, 45, 50, 50, 50, 50, 40, 40; entanglement energy 0.12 HPhr/lb. These pressures are in bar. The top web of sample 19 was a 45 gsm waterleaf comprising eucalyptus fibers.

Sample 20 is similar to sample 11 and comprised base sheet AB. The top web of sample 20 was a 45 gsm waterleaf comprising eucalyptus fibers.

For both samples the waterleaf web was immersed in the sulfuric acid gelatinizing agent and the base web was introduced into the gelatinizing agent on top of the waterleaf web. Press rolls were used at the exit of the gelatinizing agent tank to expel any air trapped between the webs and to help consolidate the layers. The press rolls also reduced the overall thickness of the composite, reinforced parchment paper. Physical properties for these composite reinforced parchmented paper samples are shown in the following Table. Delamination of the samples was difficult.

TABLE 12

| sample |  | top sheet | base sheet | 20 | 19 |
| --- | --- | --- | --- | --- | --- |
| Property | Units |  |  |  |  |
| Basis Weight | gsm | 45 (nom) |  | 140.6 | 138.6 |
| Thickness | microns |  |  | 325 | 242 |
| Tear | mN | 406 | 3132 | 2385 | 3236 |
| Dry MD Tensile Strength | dN/15 mm | 4.6 | 3.58 | 8.04 | 8.96 |
| Dry CD Tensile Strength | dN/15 mm | 2.5 | 1.87 | 4.36 | 3.45 |
| Dry Grain | % | 54.3 | 52.2 |  | 38.5 |
| Dry MD Elongation | % | 1.85 | 25.89 | 2.01 | 1.47 |
| Dry CD Elongation | % | 8.25 | 42.07 | 3.23 | 4.4 |
| Bulk | cm³/g |  |  | 1.6 | 1.77 |
| DL front side |  |  |  | 3 | 3[1] |
| Bekk Smoothness recto | s |  |  | 11 | 13 |
| Bekk Smoothness verto | s |  |  | 10 | 11 |
| soaked MD Tensile Strength | dN/15 mm |  |  | 4.6 | 4.93 |
| soaked CD Tensile Strength | dN/15 mm |  |  | 2.4 | 2.8 |
| soaked Grain | % |  |  | 52.2 |  |
| soaked MD Elongation | % |  |  | 8.7 | 7.61 |
| soaked CD Elongation | % |  |  | 12.28 | 10.18 |
| Internal Cohesion | N |  |  | 2500 | 5600 |
| pH surface |  |  |  |  | 3.5,4.5 |
| pH water extract |  |  |  |  | 4.6 |
| absorbency |  |  |  |  | stopped climbing |

TABLE 12-continued

| sample | | top sheet | base sheet | 20 | 19 |
|---|---|---|---|---|---|
| absorption cap | % | | | | 135 |
| porosity | | | | | 1.38 |
| dry burst | kPa | | | | 262 |
| soaked burst | kPa | | | | 284 |

[1]The grease barrier value of 3 was due to pinholes in the sample. A second sample taken from a smooth section at the center of the deckle of this composite, reinforced parchmented paper had a grease barrier value of 5.

Example 5

Composite, Reinforced Parchmented Paper

Additional composite, reinforced parchmented paper samples were prepared in the laboratory. The base web, entangled cellulose material; entanglement conditions and top web are set out in the following Table.

TABLE 13

| | base web | | cellulose | | |
|---|---|---|---|---|---|
| sample | web type | basis weight | primary material | secondary material | cellulose to base web attachment |
| 21 | PP spunbond | 40 | 40 gsm tissue | none | hydroentanglement, 2 passes 500, 500, 650, 800, 800, 500; energy 0.17 HPhr/lb. |
| 22 | PP spunbond | 34 | 40 gsm tissue | none | hydroentanglement, 2 passes; energy 0.18 HPhr/lb. |
| 23 | PP spunbond | 25 | 40 gsm tissue | none | hydroentanglement, 2 passes; energy 0.21 HPhr/lb. |
| 24 | PP spunbond | 40 | 40 gsm tissue | 20 gsm tissue | hydroentanglement, one pass per top web, 40 gsm pass 500, 500, 650; energy 0.07 HPhr/lb. 20 gsm pass 300, 400, 400, 300; energy 0.04 HPhr/lb. |
| 25 | PET spunbond | 50 | 40 gsm tissue | 20 gsm tissue | hydroentanglement, one pass per top web, 40 gsm pass 500, 500, 650; energy 0.06 HPhr/lb. 20 gsm pass 300, 400, 400, 300; energy 0.03 HPhr/lb. |
| 26 | PET spunbond | 50 | 40 gsm tissue | | hydroentanglement, 2 passes 500, 500, 650, 800, 800, 500; energy 0.15 HPhr/lb. |

The samples were parchmented by immersion in 72% sulfuric acid at 11° C. for 20 seconds, followed by washing in water, softening in a 10% glycerin bath and plate drying. Physical properties for these composite reinforced parchmented paper samples are shown in the following Table.

TABLE 14

| | | sample | | | | | |
|---|---|---|---|---|---|---|---|
| Property | Units | 21 | 22 | 23 | 24 | 25 | 26 |
| Basis Weight | gsm | 116 | 108 | 93 | 156 | 165 | 126 |
| Thickness | microns | 262 | 244 | 206 | 332 | 297 | 235 |
| density | g/cc | .44 | .44 | .45 | .47 | .56 | .54 |
| Dry CD Tensile Strength | N/m | 1660 | 1280 | 850 | 1290 | 1770 | 1960 |
| Wet CD Tensile Strength | N/m | 1470 | 1220 | 900 | 1410 | 1440 | 1650 |
| Dry CD Elongation[1] | % | 25 | | | 10 | 11 | 18 |
| Wet CD Elongation[2] | % | 47 | 60 | 55 | 36 | 29 | 54 |

[1]This test is for dry CD elongation at fracture of the parchmented layer which precedes fracture of the composite structure.
[2]This test is for wet CD elongation at fracture of the parchmented layer, which precedes fracture of the composite structure.

Dry CD Tensile Strength

The dry CD tensile strength results are approximately linear over the range studied. Based on these results a 46 gsm base web entangled with a top web of 40 gsm would be expected to have a dry CD tensile strength of 2000 N/m in the final composite, reinforced parchmented paper. This dry CD tensile strength is close to the dry CD tensile strength found in some conventional casing materials. The predicted dry CD tensile strength for a structure based on a 50 gsm PP web entangled with a top web of 40 gsm would be 2200 N/m in the final composite, reinforced parchmented paper. This dry CD tensile strength would match the dry CD tensile strength found in some conventional casings. For reference, sample 26 based on a 50 gsm PET spunbond web delivered a dry CD tensile strength of 1960 N/m, below the predicted level for PP webs.

Wet CD Tensile Strength

The CD tensile strength results after soaking of the samples in water for 30 minutes are approximately linear over the range studied. Based on these results a 53 gsm base web entangled with a top web of 40 gsm would be expected to have a wet CD tensile strength of 2000 N/m in the final composite, reinforced parchment paper. This wet CD tensile strength is close to the wet CD tensile strength found in some conventional casings. For reference, sample 26 based on a 50 gsm PET spunbond web delivered a wet CD tensile strength of 1650 N/m, below the predicted performance line for PP webs.

Dry CD Elongation at Fracture

The dry CD Elongation at fracture results (of the parchment layer, which precedes break of the entire structure) results are approximately linear over the range studied. Based on these results a 50 gsm PP base web entangled with a top web of 40 gsm would be expected to have a dry elongation at fracture of 31%. For reference, sample 26 based on a 50 gsm PET spunbond web delivered a dry CD elongation at fracture of 18%, well below the predicted performance line for PP webs.

Wet CD Elongation at Fracture

There does not seem to be a clear relationship between the CD Elongation at fracture results (of the parchment layer, which precedes break of the entire structure) after soaking the parchmented samples in water for 30 minutes and the basis weight of the base web. If the result for sample 26 (based on a 50 gsm PET spunbond base web) is also considered then the plot could be considered to be horizontal i.e. wet CD elongation at fracture does not respond to basis weight. The sample values are very favorable when considered against the minimum values and typical values found in some conventional meat casings (20% minimum and 30-40% typically).

Polyester Vs. Polypropylene Comprising Base Webs

Two paired comparisons are available. Samples 21 (PP base sheet) and 26 (PET base sheet) were made on the same equipment by hydroentangling a base web with a 40 gsm tissue web using two passes, one pass at 500,500,650,800 and a second pass at 800, 500. Some properties of samples 21 and 26 are set out in the following table.

TABLE 15

| sample | 21 | 26 |
|---|---|---|
| Base Web polymer | PP | PET |
| Base Web Basis Weight | 40 | 50 |
| Parchmented Basis Weight | 116 | 126 |
| Dry CD Tensile | 1660 | 1960 |
| Dry CD Elongation | 25 | 18 |
| Soaked CD Tensile | 1470 | 1650 |
| Soaked CD fracture Elongation | 47 | 54 |
| DL grease barrier | −3 | −3 |

The 10 gsm difference in base web basis weight is carried through into the parchmented structure. Both samples lose strength in going from the dry to the wet state. Sample 26 offers some advantage in dry tensile strength over 21 (PP) in both the dry and wet states. Sample 26 offers less elongation at fracture in the dry state than sample 21 but slightly more elongation in the wet state.

Samples 24 (PP base sheet) and 25 (PET base sheet) use the same base webs as samples 21 and 26 respectively. However, the base webs in samples 24 and 25 are hydroentangled with two tissue webs. The first tissue web was a 40 gsm tissue hydroentangled using a profile of 500,500,650. Subsequently, a 20 gsm tissue was hydroentangled to the base web-first tissue composite using a second profile of 300,400,400,300. Some properties of samples 24 and 25 are set out in the following table.

TABLE 16

| sample | 24 | 25 |
|---|---|---|
| Base Web polymer | PP | PET |
| Base Web Basis Weight | 40 | 50 |
| Parchmented Basis Weight | 156 | 165 |
| Dry CD Tensile | 1290 | 1770 |
| Dry CD Elongation | 10 | 11 |
| Soaked CD Tensile | 1410 | 1440 |
| Soaked CD fracture Elongation | 36 | 29 |
| DL Greaseproof Test | +1 | +1 |

The 10 gsm difference in base web basis weight is carried through into the parchmented structure. Sample 25 loses strength in going from the dry to the wet state, but sample 24 appears to gain in strength. This suggests that the value measured for sample 24 in the dry state is an underestimate. Wet tensile strengths for samples 24 and 25 are nearly equivalent. There is no significant difference in the dry elongation at fracture between samples 24 and 25. Sample 24 offers more elongation in the wet state than sample 25.

Hydroentangling Profile

Two comparisons are available, 21 versus 24 (both PP base webs) and 26 versus 25 (both PET base webs). All of samples 21, 24, 26 and 25 are hydroentangled with a 40 gsm tissue web. Samples 24 and 25 are subsequently entangled with a second 20 gsm tissue web.

In both sample 24 and sample 25 the heavier weight of the composite reinforced parchmented paper fails to deliver any superiority in dry or soaked tensile strength. On the contrary, the heavier basis weight samples (samples 24 and 25) are generally weaker than their lighter basis weight counterparts (samples 21 and 26 respectively). The higher basis weight samples (24 and 25) also have less stretch at fracture than their lighter basis weight counterparts (samples 21 and 26 respectively). Adding the second tissue layer in this way does not appear to contribute to strength or stretch of the resulting composite, reinforced parchment paper, but does enhance grease barrier results from −3 to +1.

Consolidation is greater in the heavier basis weight samples (samples 24 and 25) than in their lighter basis weight counterparts (samples 21 and 26 respectively). This is indicated in the near equivalence in thickness in spite of the heavier basis weights of parchmented samples 24 and 25. This is further evident by considering that only 20 gsm of additional tissue web was entangled into the base web of samples 24 and 25, but basis weight of those samples after parchmenting increased by about twice that amount. Consolidation on PET based samples (25 and 26) is higher than on PP based samples (21-24).

Example 6

Composite Reinforced Parchmented Paper

Composite, reinforced parchmented papers were produced from overlaid first sheets and second sheets. The following Table illustrates the composition of samples 27, 28 and 29. Hydraulic entanglement of cellulose to the extruded web material was done under moderate conditions.

TABLE 17

| | | first (base) sheet | | | | second (top) sheet | |
|---|---|---|---|---|---|---|---|
| | | extruded web material | | entangled cellulose | | | |
| sample | ID | polymer | basis wt | material | basis wt | material | basis wt |
| 27 | AB | PP | 40 | mixture[1] | 30 | waterleaf | 30 |
| 28 | AC | PP | 42 | mixture[1] | 30 | waterleaf | 30 |
| 29 | AD | PP | 25 | mixture[1] | 20 | waterleaf | 30 |

[1]A mixture comprising 30% red cedar wood pulp and 70% eucalyptus wood pulp.

The base sheets and top sheets were parchmented and laminated in a single operation as follows. The 2 sheets are immersed at the same time in the sulfuric acid bath at normal gelatinizing concentration and temperature for 8 seconds, drained for 4 seconds and then overlaid and pressed with a roll for 8 seconds. All of the composite, reinforced, parchmented paper samples were washed under running tap water for 10 to 15 minutes, immersed into an aqueous 10 percent glycerin bath at room temperature for 20 seconds and dried on a plate dryer at 110° C. for 10 minutes.

Physical Properties of the Composite, Reinforced Parchmented Paper after Parchmenting.

TABLE 18

| sample | | 27 | 28 | 29 |
|---|---|---|---|---|
| extruded web material | | AB | AC | AD |
| entangled cellulose weight | gsm | 30 | 30 | 20 |
| top sheet weight | gsm | 30 | 30 | 30 |
| DL front side | | 4 | 4 | 4 |
| DL reverse side | | 2 | 2 | 1 |
| Grammage | g/m$^2$ | 128 ± 1 | 122 ± 8 | 106 ± 6 |
| thickness | μm | 277 ± 11 | 286 ± 15 | 196 ± 7.5 |
| burst | KPa | 314 ± 8 | >400 | 199 ± 1 |
| PPS front side | ml/min | 1.06 ± 0.04 | 1.86 ± 0.8 | 1.33 ± 0.42 |
| PPS back side | ml/min | 548.6 ± 110.1 | 1411.5 ± 258 | 126.4 ± 42 |
| Textest | l/m$^2$/s | 1.055 ± 0.21 | 4.84 ± 0.54 | — |
| CD tear (non woven method) | N | 25 | 120 | 20 |
| Dry CD elongation at break | % | 23.28 ± 7.94 | 32.81 ± 7.73 | 16.03 ± 3.54 |
| Dry MD elongation at break | % | 13.71 ± 1.64 | 30.81 ± 6.43 | 12.43 ± 0.47 |
| Dry CD elongation at fracture | % | 9.6 ± 1.5 | 7.8 ± 0.8 | 8.1 ± 1 |
| Dry MD elongation at fracture | % | 7.9 ± 0.8 | 6.1 ± 0.5 | 6.5 ± 0.4 |
| Dry CD tensile strength | N/m | 1400 ± 110 | 1360 ± 260 | 840 ± 70 |
| Dry MD tensile strength | N/m | 2870 ± 190 | 2570 ± 270 | 2530 ± 220 |
| Dry CD young modulus | MPa | 156 ± 32 | 117 ± 16 | 157 ± 33 |
| Dry MD young modulus | MPa | 269 ± 42 | 305 ± 48 | 426 ± 73 |
| Soaked CD elongation at break | % | 41.2 ± 8.39 | 40.52 ± 9.31 | 34.50 ± 12.98 |
| Soaked MD elongation at break | % | 26.47 ± 4.09 | 39.61 ± 9.42 | 42.11 ± 10.04 |
| Soaked CD elongation at fracture | % | 18.8 ± 2.5 | 12.2 ± 0.7 | 15.3 ± 2.3 |
| Soaked MD elongation at fracture | % | 9.1 ± 1.2 | 7.6 ± 0.7 | 8.2 ± 0.4 |
| Soaked CD tensile strength | N/m | 1340 ± 110 | 1510 ± 190 | 720 ± 130 |
| Soaked MD tensile strength | N/m | 2090 ± 180 | 1780 ± 230 | 1940 ± 200 |
| Soaked CD young modulus | MPa | 32 ± 2 | 66 ± 5 | 26 ± 1 |
| Soaked MD young modulus | MPa | 97 ± 12 | 108 ± 14 | 127 ± 6 |

Example 7

A paper base sheet was formed from a mixture of abaca fibers and woodpulp fibers. The fibers were treated with Kymene 557H before being wet laid on the paper-making screen. After the paper had been dried, it was immersed in a bath of 70% sulfuric acid aqueous solution at 12° C. for 20 seconds, after which it was washed with water. The resultant sheet was then treated with glycerol (approximately 20% wt/wt aqueous solution) and dried.

The resultant reinforced parchmented paper (sample 30) was subjected to a number of standard tests, the results of which are presented in the following table. The table also presents, for comparison purposes, the results obtained with a commercially available fibrous casing and with a conventional parchment paper.

TABLE 19

| Property | Units | Commercial Fibrous Casing | Conventional Parchment Paper | sample 30 |
|---|---|---|---|---|
| Basis weight | g/m² | 115 | 104 | 159 |
| Tensile Strength, MD | N/m | 6663 | 13058 | 6363 |
| Tensile Strength, CD | N/m | 5686 | 7395 | 4928 |
| Wet elongation, MD | % | 19.1 | 6.9 | 20.9 |
| Wet elongation, CD | % | 42.1 | 24.4 | 35 |
| Tear resistance, Elmendorff, MD | mN | 560 | 520 | 840 |
| Tear Resistance, Elmendorff, CD | mN | 600 | 480 | 560 |

Example 8

Morphology of Composite, Reinforced Parchmented Paper

Sample 31 is a composite, reinforced parchmented material comprising the same materials and processing as sample 19. Sample 32 comprised a 40 gsm polypropylene filament spunbond wed hydroentangled under moderate pressure to 30 gsm of red cedar pulp to form a base web. A 45 gsm eucalyptus fiber waterleaf sheet was acid laminated to the base web under normal conditions. The vegetable parchment (VP) sample is a 100% eucalyptus fiber waterleaf sheet material that has been subjected to parchmenting using sulfuric acid as the gelatinizing agent under normal conditions to provide a 40 gsm parchmented material. A commercial fibrous reinforced cellulosic casing was also examined.

The top surface, bottom surface and cross section of each sample was examined for each sample using a scanning electron microscope.

VP Material Versus Casing Material

Figure 3:
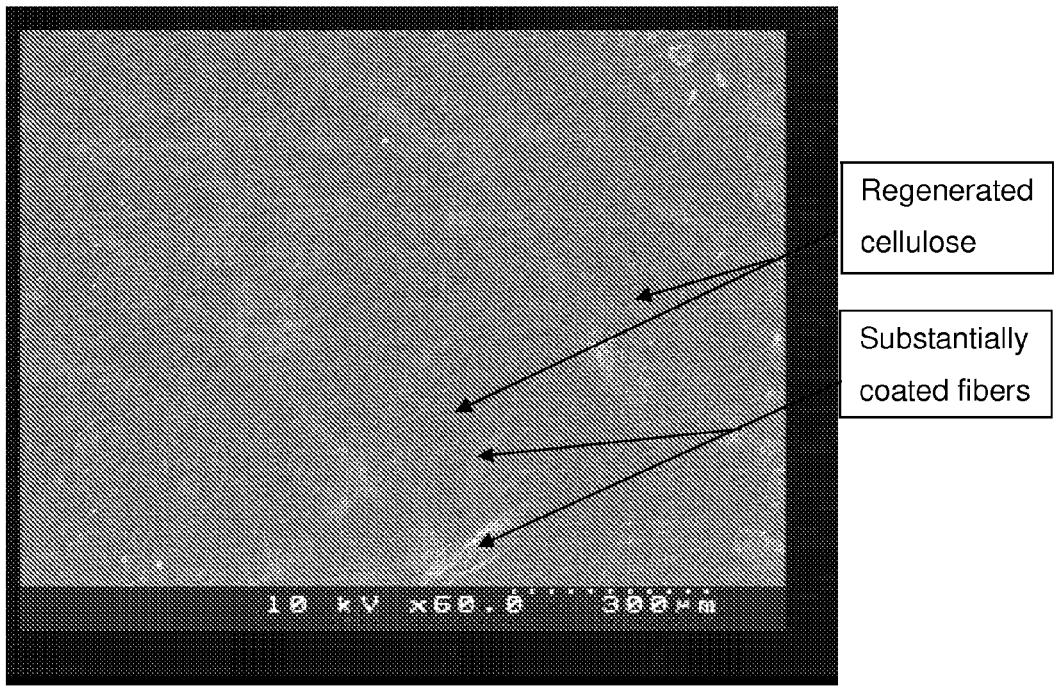
FIG. 3 is a micrograph of the outside surface of a commercially available casing material.
Figure 4:
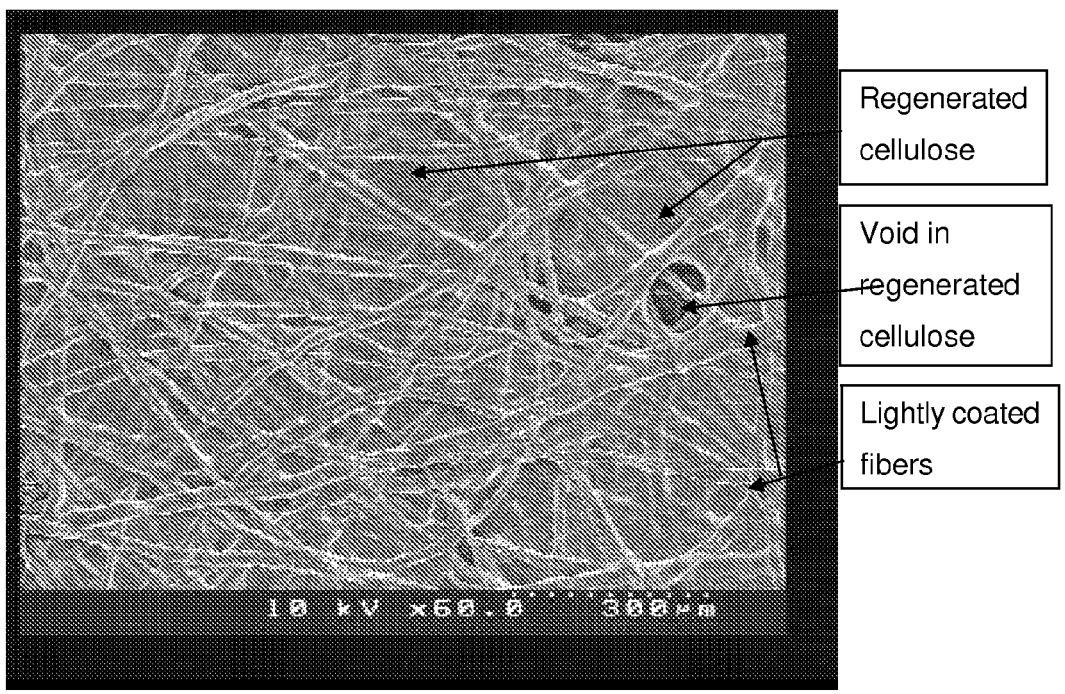
FIG. 4 is a micrograph of the inside surface of a commercially available casing material.

The commercially available tubular casing sample shows substantially differences between the outside surface (FIG. 3) and the inside surface (FIG. 4) at 60×. The casing is constructed by applying a thick coating of liquid viscose to a tubular, fibrous, nonwoven web before regenerating that coating back to cellulose. Most of the coating is applied from the outside. Fibers can be clearly seen in FIG. 4 through the thin coating of cellulose on the inside surface of the tube. It is much more difficult to see fibers in FIG. 3 through the opaque coating on the outside surface of the tube.

Figure 2:
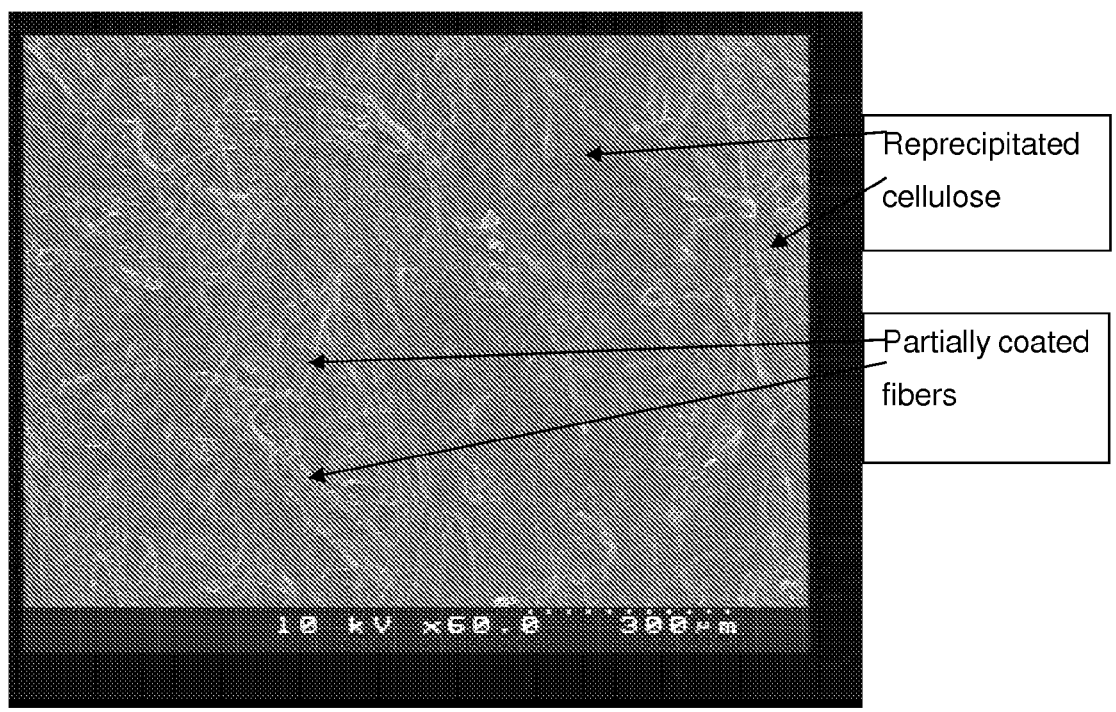
FIG. 2 is a micrograph of the bottom surface of a vegetable parchment (VP) sample.

There appears to be little difference between the top surface (FIG. 1) and bottom surface (FIG. 2) of the VP sample at 60×. Both surfaces of the VP sample have an appearance that lies between that of the two surfaces of the casing. This reflects the fact that the VP sample is treated from both sides but the amount of reprecipitated cellulose in the VP sample is around 30% maximum versus up to 80% regenerated cellulose in casing.

Top Surface—Composite, Reinforced Parchmented Paper

Figure 5:
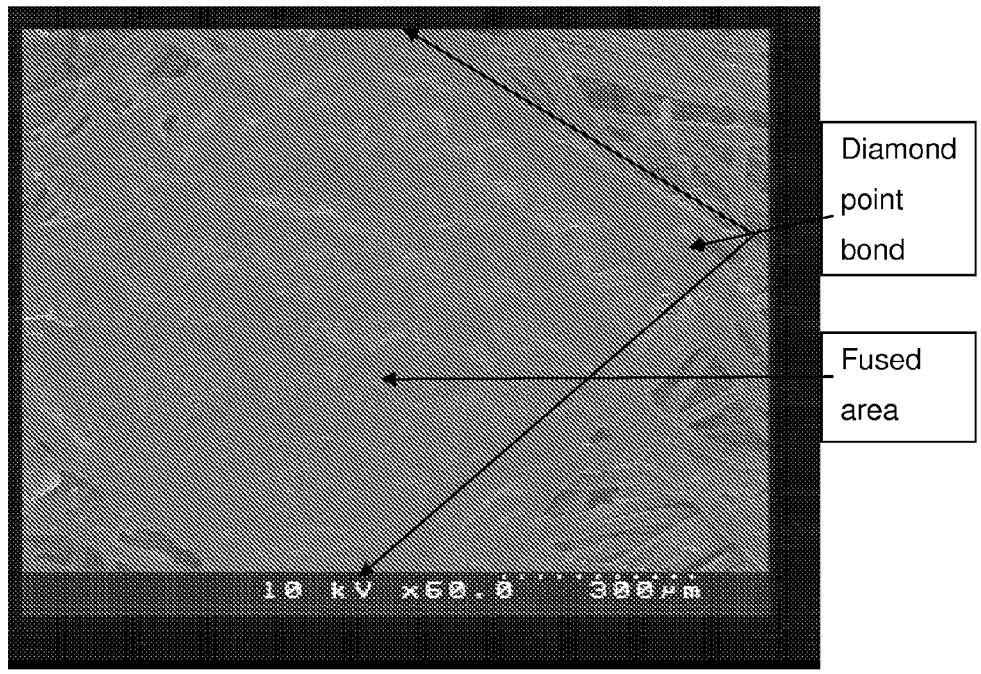
FIG. 5 is a micrograph of the top surface (spunbond base sheet face) of one embodiment of a composite, reinforced parchmented paper.
Figure 6:
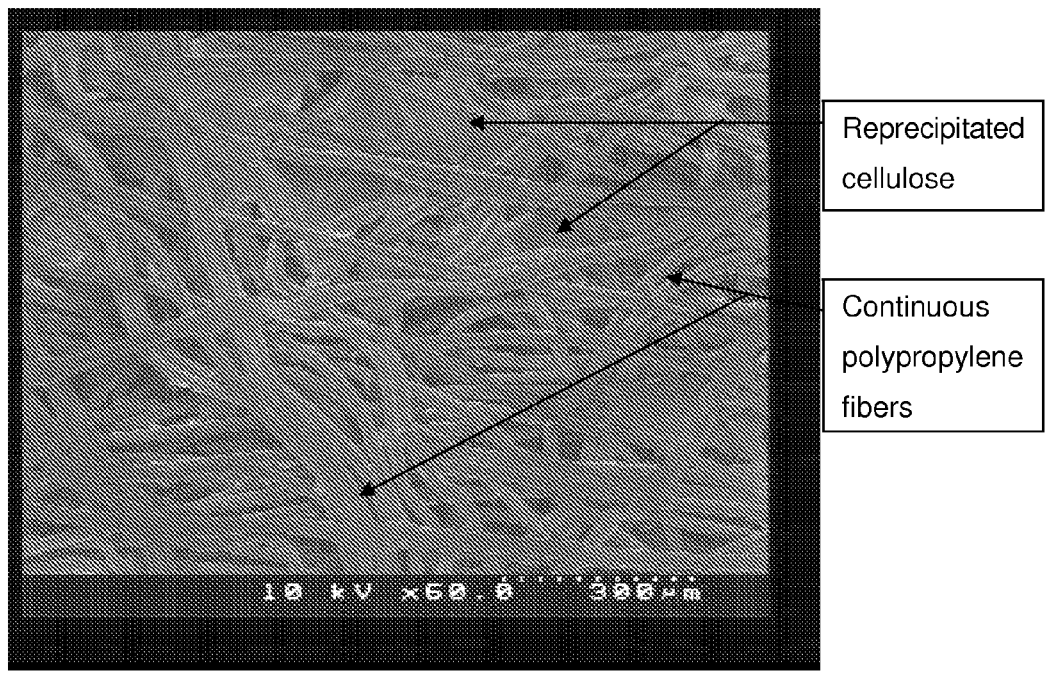
FIG. 6 is another micrograph at a different position of the top surface of the composite, reinforced parchmented paper sample of FIG. 5.
Figure 7:
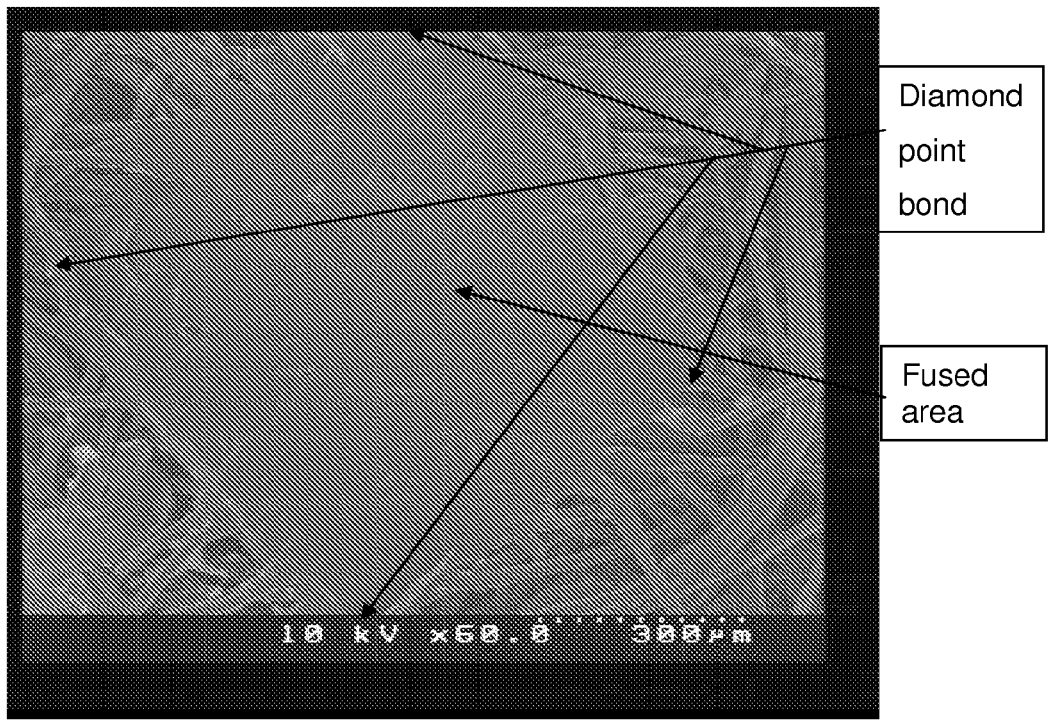
FIG. 7 is a micrograph of the top surface (spunbond base sheet face) of an embodiment of a composite, reinforced parchmented paper.
Figure 8:
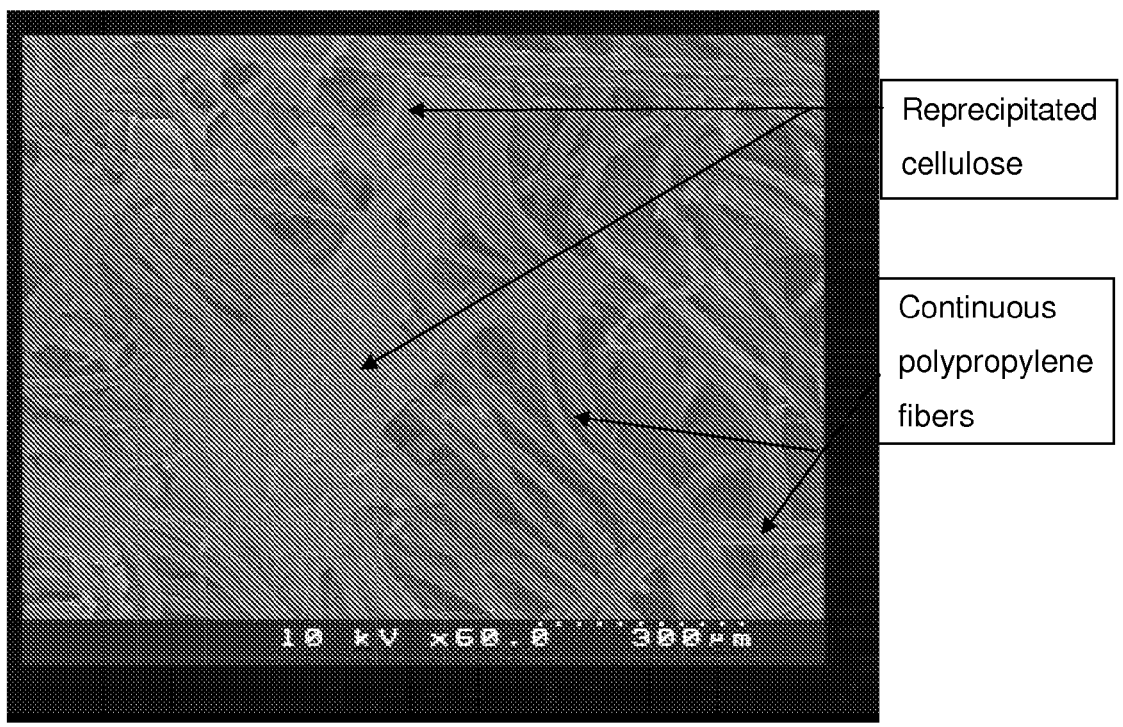
FIG. 8 is another micrograph at a different position of the top surface of the sample of FIG. 7.

FIGS. 5 and 6 illustrate two different views of the top surface (spunbond base web side) of sample 31 at 60×. In FIG. 5 a point bonded area is seen. This is a diamond shaped area where the polypropylene fibers have been fused together by the embossing roll during the calendar operation. FIG. 6 shows an area between point bonds where distinct fibers can clearly be seen. There is some evidence of web-like structure between some fibers in FIG. 6. The web-like structure is believed to be reprecipitated cellulose from the parchmenting process. The top surface of sample 31 is very open and porous compared to the VP sample or casing sample. FIGS. 7 and 8 illustrate the equivalent top surface (spunbond base web side) views for sample 32 at 60×. Sample 32 has top surface features similar to sample 31.

Bottom Surface—Composite, Reinforced Parchmented Paper

Figure 9:
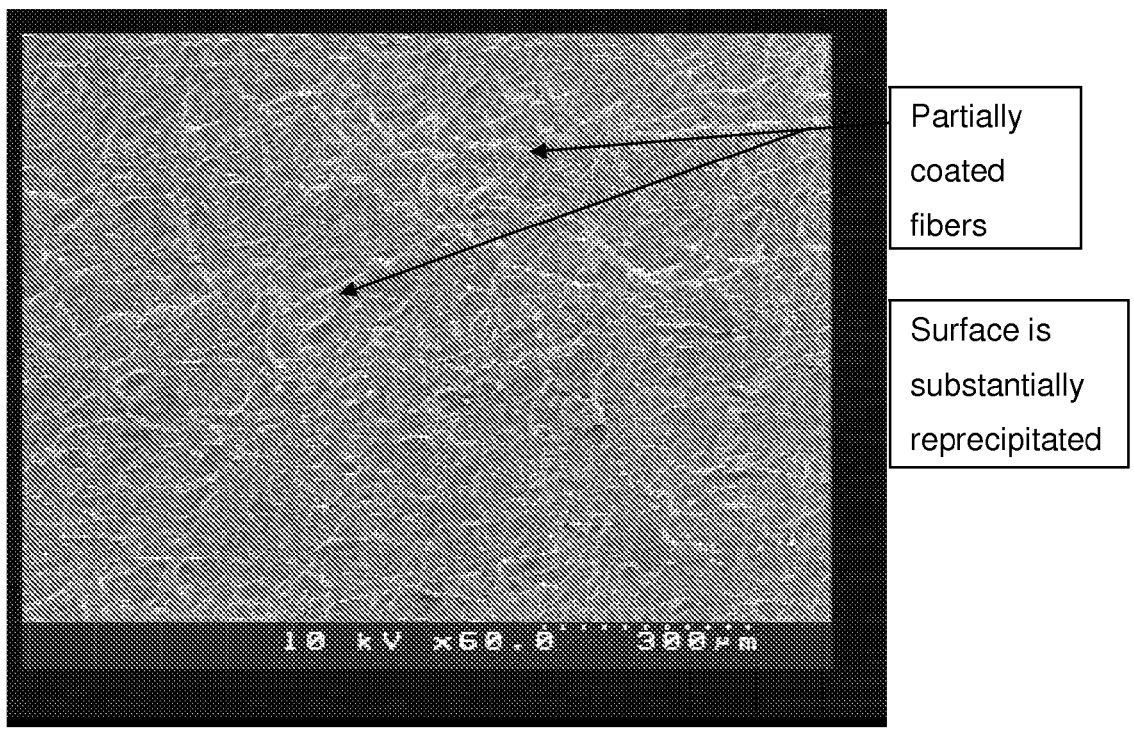
FIG. 9 is a micrograph of the bottom surface (parchmented waterleaf sheet face) of the composite, reinforced parchmented paper sample of FIG. 5.
Figure 10:
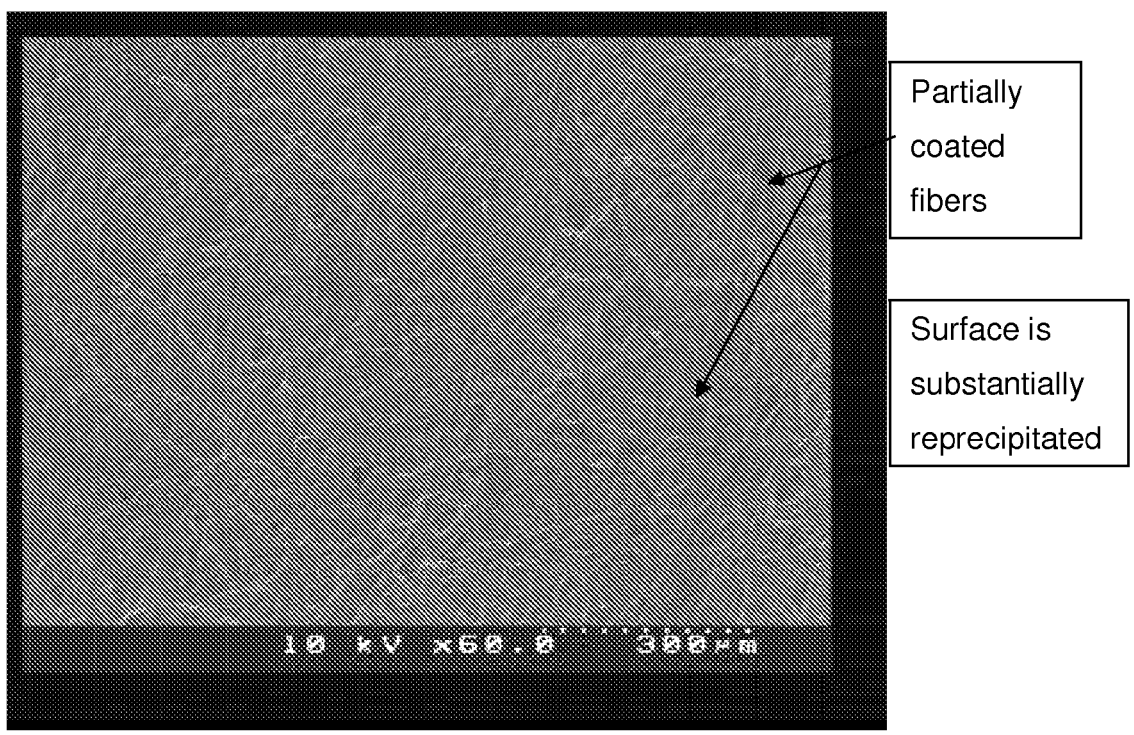
FIG. 10 is a micrograph of the bottom surface (parchmented waterleaf sheet face) of the composite, reinforced parchmented paper sample of FIG. 7.

FIG. 9 illustrates the bottom surface (parchmented waterleaf sheet side) of sample 31 at 60×. FIG. 10 illustrates the bottom surface (parchmented waterleaf sheet side) of sample 32 at 60×. The bottom surfaces of samples 31 and 32 are similar in appearance to the VP sample surface. The fibrous structure of samples 31 and 32 is much less distinct than on the inner surface of casing. The bottom surfaces of samples 31 and 32 are originally the waterleaf sheet and produce a surface similar to VP once parchmented by acid.

Edge Cross Section—Composite, Reinforced Parchmented Paper

Figure 11:
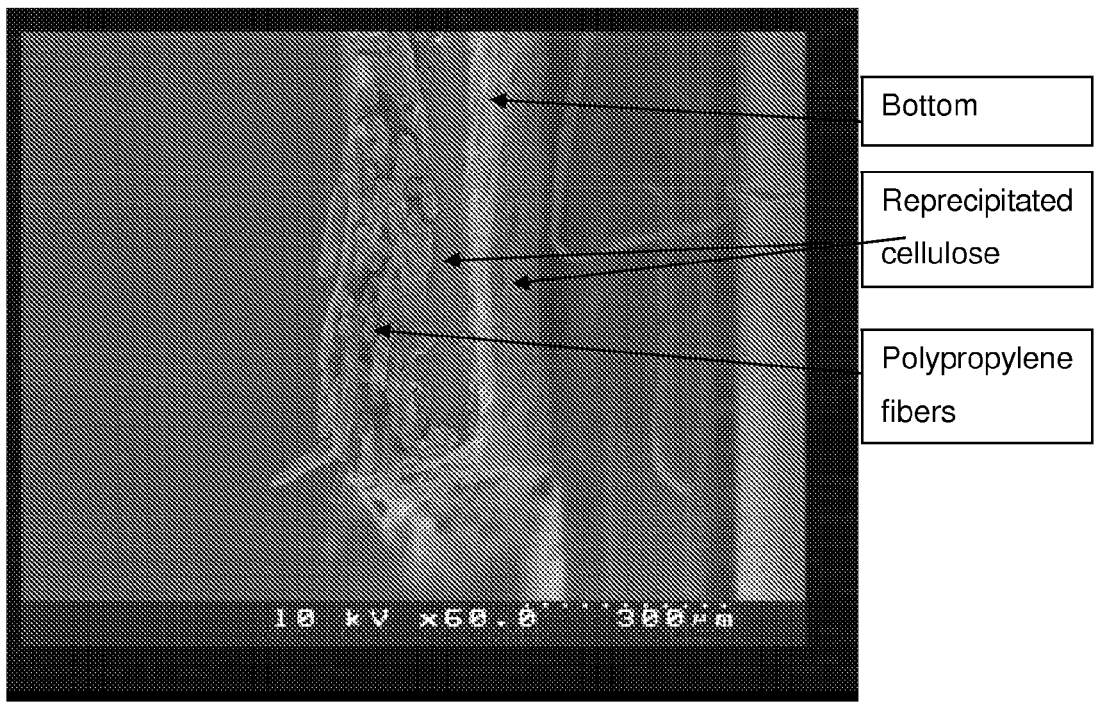
FIG. 11 is a micrograph of an edge cross section of the composite, reinforced parchmented paper sample of FIG. 5.

FIG. 11 illustrates the edge cross section of Sample 31 at 60× magnification. FIG. 11 clearly shows the compacted, reprecipitated outer skin of the 31 sample (right side of figure) formed by the parchmented waterleaf sheet, which is equivalent to VP. Underlying the outer skin is an amorphous section of parchmented cellulose from the precipitated, hydroentangled woodpulp. Polypropylene fibers from one face of the base web are partially embedded in one portion of the parchmented cellulose. The opposing face of the base web, which is also the fibrous face of the composite reinforced parchmented paper, is substantially fibrous with a minor amount of parchmented cellulose.

Figure 12:
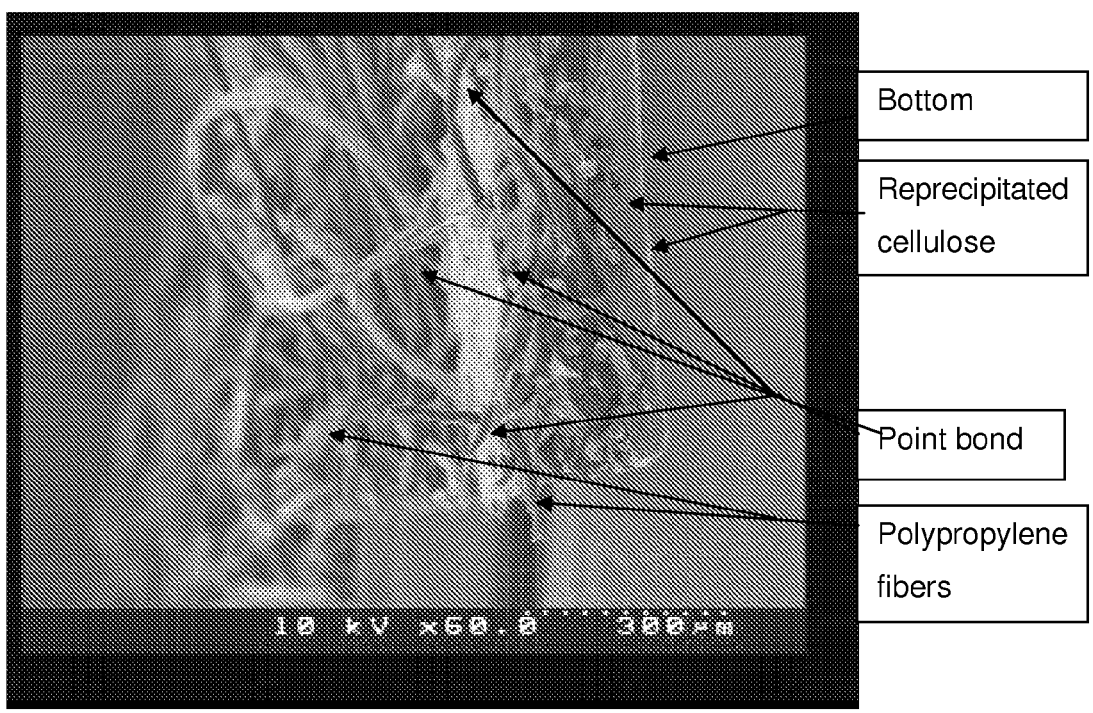
FIG. 12 is a micrograph of an edge cross section of the composite, reinforced parchmented paper sample of FIG. 7.

FIG. 12 illustrates the edge cross section of sample 32 at 60× magnification. The 32 sample exhibits similar morphology to the 31 sample, although the sample angle used for the 32 sample is different from the angle used for the 31 sample. A portion of the top surface of the 32 sample can be seen, including a diamond shaped point bond area. There are many fibers looping out from the top surface. These projecting fibers may be a consequence of sample preparation.

Figure 13:
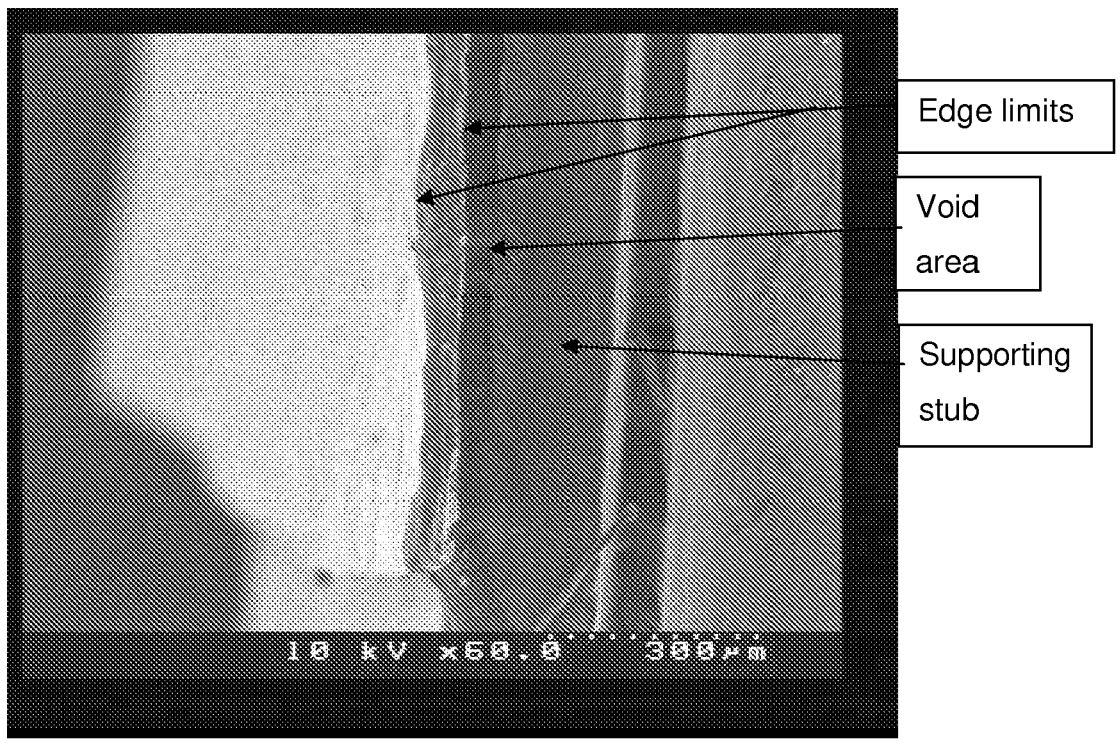
FIG. 13 is a micrograph of an edge cross section of the casing material of FIG. 3.
Figure 14:
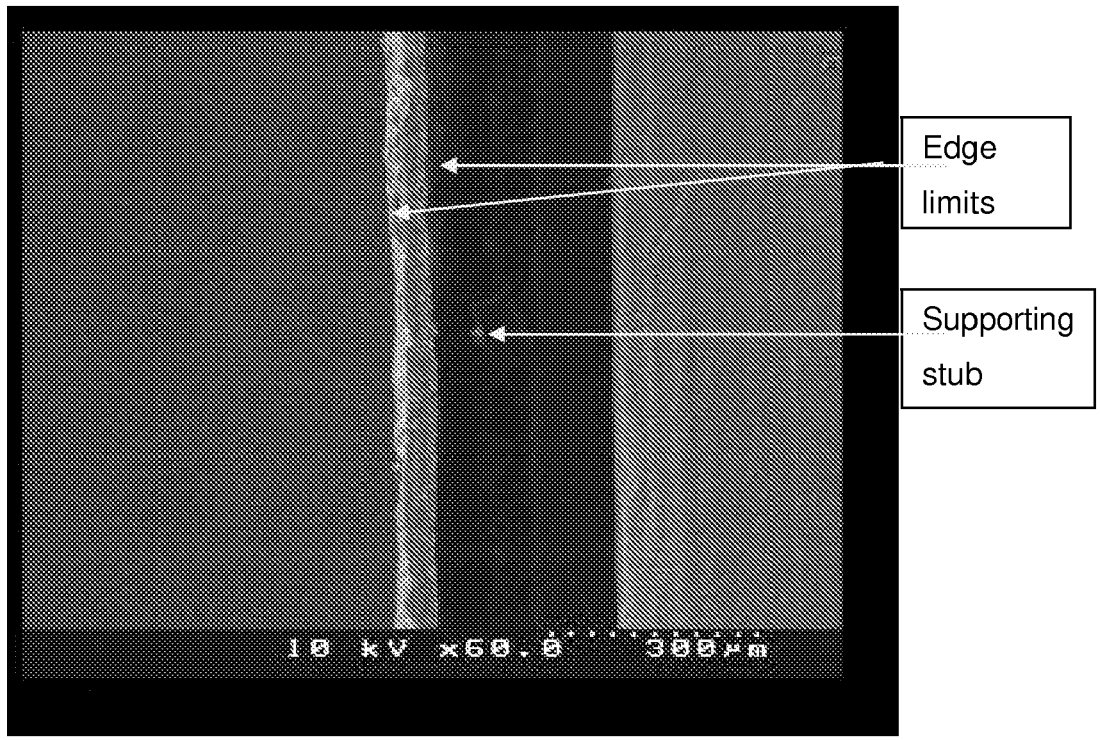
FIG. 14 is a micrograph of an edge cross section of the vegetable parchment material of FIG. 1.

FIG. 13 illustrates a casing material edge and FIG. 14 illustrates a VP material edge at the same magnification. The casing edge in FIG. 13 is only the immediate pale gray area to the right of the shiny surface near the middle of the micrograph. The very dark band vertically down the center of the photograph is a void area between the casing sample and the supporting stub. The VP material edge in FIG. 14 is the pale Grey area to the immediate left of dead center in this image.

Figure 15:
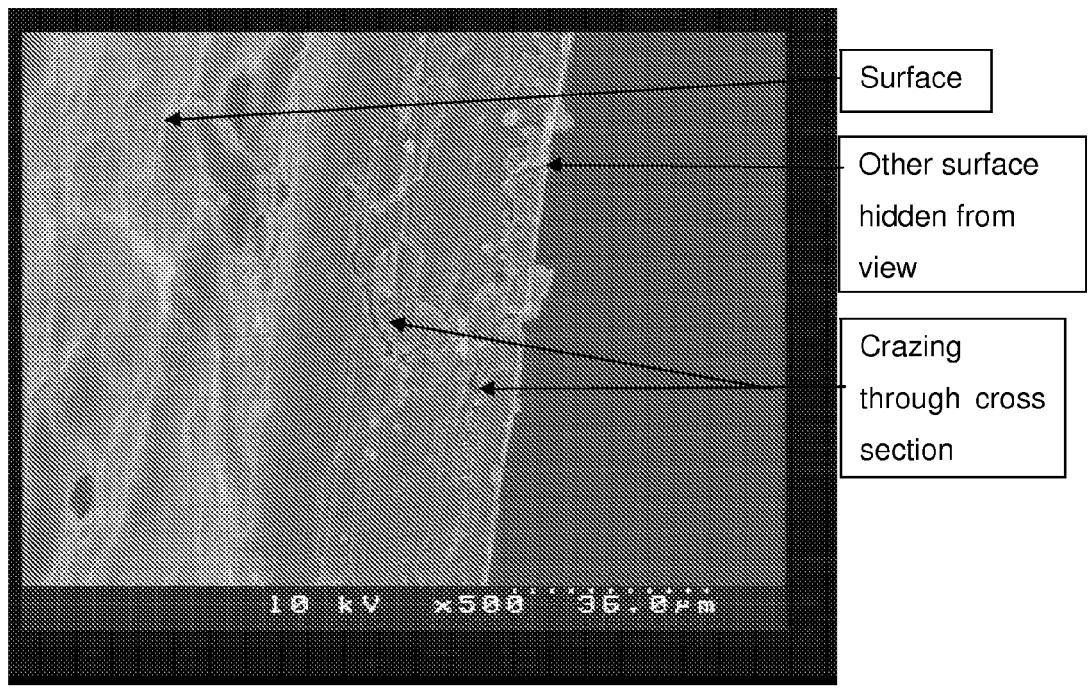
FIG. 15 is a micrograph of an edge cross section of the vegetable parchment material of FIG. 1.

FIG. 15 illustrates a VP material edge at 500× magnification. The VP material edge shows no internal fibrous structure through the cross section. The edge is amorphous and has a brittle and crazed appearance. The crazing may be an artifact of sample preparation. The casing material and VP material are both much thinner than the composite, reinforced parchmented paper samples shown in FIGS. 17 and 18 by 2 to 3 times.

Figure 16:
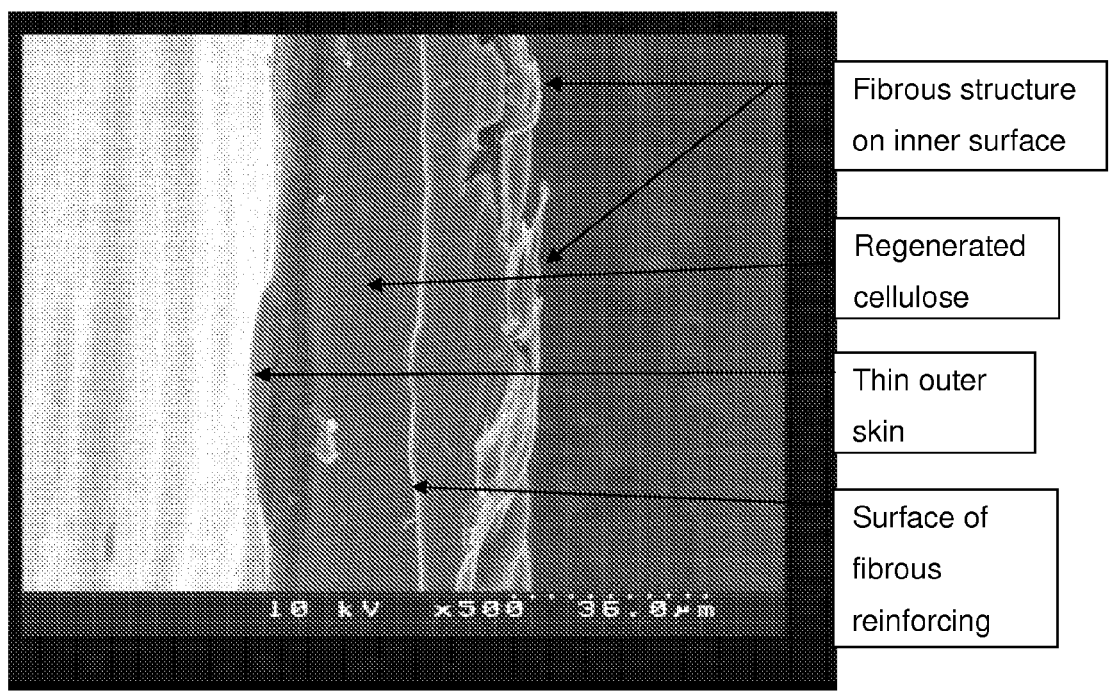
FIG. 16 is a micrograph of an edge cross section of the casing material of FIG. 3.

FIG. 16 illustrates a casing material edge at 500× magnification. The casing edge again shows the fibrous structure of the inside surface. Overlying the fibrous structure is a largely amorphous layer up to the top layer of fine skin. There is a white line down the center of the image, which may be the embedded surface of the fibrous reinforcement. Note that the externally applied, regenerated cellulose layer does not appear crazed as with the VP material. This difference may reflect the different processing, cellulose regeneration in the casing material versus cellulose precipitation in the VP material. The difference may also reflect treatment of the two materials with differing amounts of glycerol softening agent.

Figure 18:
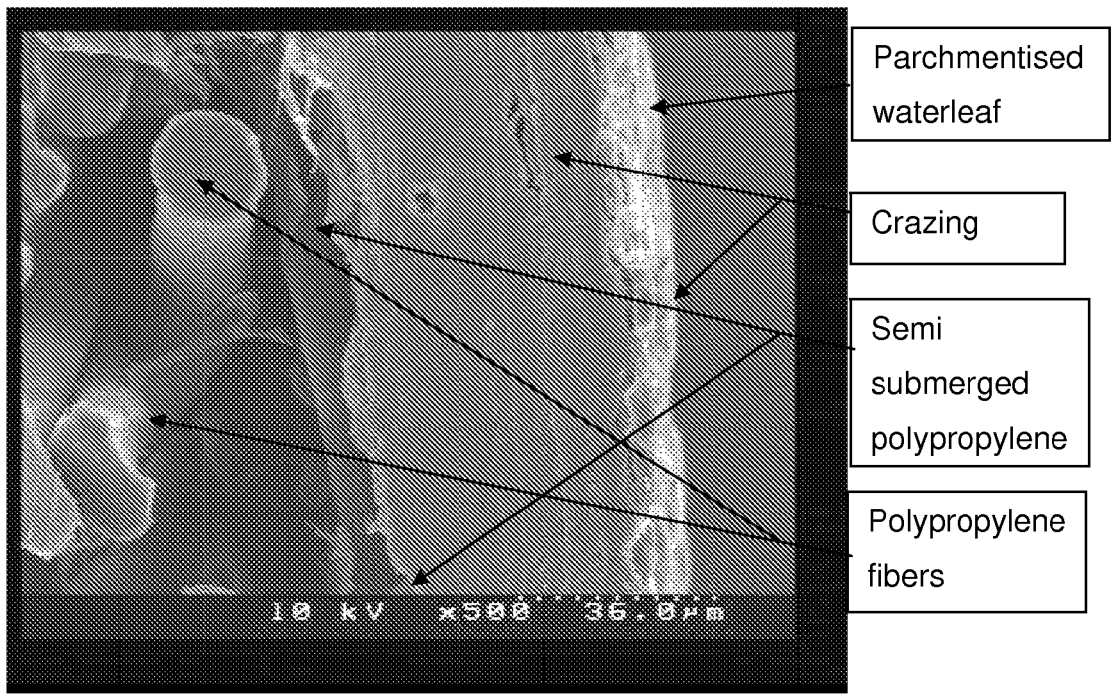
FIG. 18 is a micrograph of an edge cross section of the composite, reinforced parchmented paper sample of FIG. 7.

FIG. 18 illustrates an edge portion of the sample 32 composite, reinforced parchmented material at 500× magnification. FIG. 18 shows the parchmented waterleaf sheet surface on the right of the image. This surface is fairly featureless but shows similar crazing to that seen in FIG. 15. One polypropylene fiber can be seen running parallel to the parchmented layer and semi-submerged or partially embedded in the parchmented layer. Cross sections of other polypropylene fibers can be seen running at angles to the above fiber. The fibrous face of the sample 32 composite, reinforced parchmented material is not seen in FIG. 18.

Figure 17:
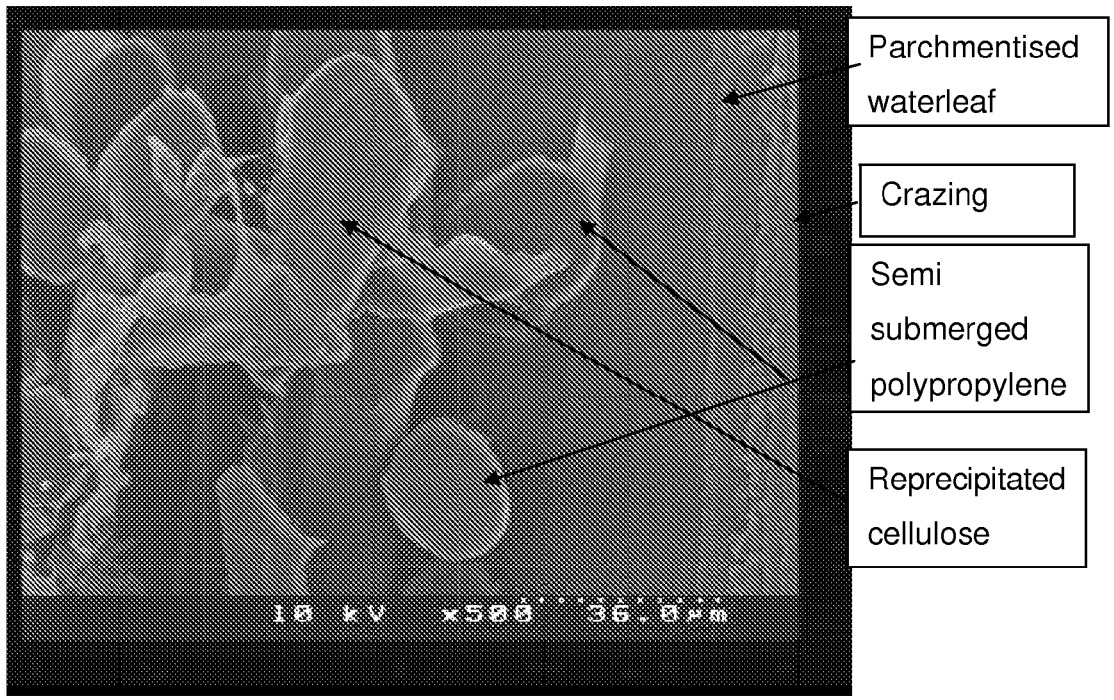
FIG. 17 is a micrograph of an edge cross section of the composite, reinforced parchmented paper sample of FIG. 5.

FIG. 17 illustrates an edge portion of the sample 31 composite, reinforced parchmented material at 500× magnification. FIG. 17 looks further up through the thickness of that sample versus the FIG. 18 Rhino image. To the right of the FIG. 17 image can be seen the parchmented waterleaf layer with some crazing. Embedded in the parchmented waterleaf layer of FIG. 17 can be seen in cross section two fibers, one fully embedded and one partly embedded. To the left of this parchmented waterleaf layer can be seen the spunbonded polypropylene sheet with some thin, flaky precipitated cellulose embedded therein.

Example 9

Composite Reinforced Parchment Paper with a Nylon Base Web

An additional example of a composite, reinforced parchment paper was produced from overlaid first sheets and second sheets. For sample 33 the first sheet is a nylon spunbond (Spectramax 1.0 osy (31 gsm) available from Cerex Advanced Fabrics Inc.) web hydraulically entangled with 30 gsm of a wood pulp mixture comprising 30% red cedar pulp and 70% eucalyptus pulp. Hydraulic entanglement was done under the following conditions.
Profile 200/500/800/800/200; entanglement energy 0.14 HPhr/lb (0.826 MJ/kg). The top sheet used is a 45 gsm waterleaf sheet (SS).

The nylon is sensitive to acid degradation if immersed in a parchment bath. Therefore, the entangled nylon sheet is not immersed in the bath with the top sheet. Rather the top sheet is immersed in the parchment bath and the entangled nylon web is laminated to the impregnated top sheet after the top sheet was removed from the bath. The entangled nylon web is placed on a surface with the tissue side uppermost. Then, the waterleaf is immersed in the acid bath (72% sulphuric acid and 11° C.) for 5 seconds before laying it over the entangled nylon sample. These two sheets are pressed (1 pass) with a roll (4.05 kg) to expel air. Then, the composite is rinsed under tap water for 10 minutes.

When the composite is neutralized, it is softened by immersion for 20 seconds in a 10% glycerin bath at room temperature. Finally, it is dried 10 minutes at 110° C. on a plate dryer.

The below table lists the physical properties of the hydraulically entangled nylon first sheet and the parchmented composite material, Sample 33.

TABLE 20

| | Sample 33 | Entangled Nylon First Sheet |
|---|---|---|
| Grammage (gsm) | 154 ± 4 | 64 ± 0.8 |
| Thickness (μm) | 294 ± 16 | 333 ± 15 |
| Porosity Textest (200 mPa) | — | 888 ± 106 |
| DRY  CD tensile strength (N/m) | 2500 ± 190 | 1310 ± 140 |
| MD tensile strength (N/m) | 3370 ± 290 | 2270 ± 240 |
| CD elongation at break (%) | 12.7 ± 0.5 | 56.2 ± 5.9 |
| MD elongation at break (%) | 6.3 ± 0.4 | 67.0 ± 5.0 |
| CD elongation at fracture (%) | 12.7 ± 0.5 | 56.2 ± 5.9 |
| MD elongation at fracture (%) | 6.3 ± 0.4 | 67.0 ± 5.0 |
| CD young modulus (MPa) | 197 ± 70 | 11.3 ± 0.9 |
| MD young modulus (MPa) | 371 ± 109 | 20.0 ± 2.1 |
| SOAKED  CD tensile strength (N/m) | 1250 ± 50 | 1310 ± 220 |
| MD tensile strength (N/m) | 1890 ± 150 | 1730 ± 310 |
| CD elongation at break (%) | 12.5 ± 0.6 | 60.0 ± 6.9 |
| MD elongation at break (%) | 7.1 ± 0.4 | 59.8 ± 4.8 |
| CD elongation at fracture (%) | 12.5 ± 0.6 | 60.0 ± 6.9 |
| MD elongation at fracture (%) | 7.1 ± 0.4 | 59.8 ± 4.8 |
| CD young modulus (MPa) | 44 ± 2 | 7.9 ± 0.7 |
| MD young modulus (MPa) | 103 ± 12 | 9.3 ± 1.0 |
| DL front side | 5 | — |
| DL back side | 4 | — |

Elongation

It should be noted that Sample 33, which is based on nylon spunlaid web, the measured elongation at fracture and break in the dry and soaked state are the same. Sample 33 had similar physical properties values to polypropylene based parchmented composites in terms of strength, elongation and grease barrier, but there is no fracture of the top layer on Sample 33 as with other polypropylene based parchmented composites samples.

It is believed that this phenomenon with nylon based composites is due to the better bonding throughout the composites structure. All the components in Sample 33 are susceptible to acid.

Example 10

Use of Composite, Reinforced Parchmented Paper as a Casing Material

Tubular sausage casings were prepared from samples of the composite, reinforced parchmented paper previously prepared. Material from sample 24 was trimmed to 180 mm width before seaming.

Samples 34 and 35 were prepared from portions of sample 24. Samples 34 and 35 were acid seamed with the cellulosic faces coming together to create an outside, radial seam. The acid seams were approximately 8 mm wide. The spunbond base web faced the exterior of the casing. The acid seams were formed as follows. The samples were cut to an appropriate length (usually 550 mm). A line was marked 6 mm in from opposing edges (one top side, one under side). The cut sample was clamped over a form with the marked edges hanging free. 68% sulfuric acid was applied to the marked edges with a brush. After about 1 minute these two edges were dry. 68% sulfuric acid was applied to each edge for a second time. After about 3 minutes the acidified edges were overlaid and clamped together for about 10 minutes. After about 10 minutes the clamp was removed, the tube was slid off of the form and cold water was run over the seam area. The tube was laid in the sink and water was allowed run over it for 10 to 15 minutes. Next the tube was transferred to a water bath for about 1 hour. Finally the tube was dried between blotters and casing paper under pressure overnight.

Samples 36 and 37 were also prepared from portions of sample 24. The sewn seams were approximately 6 mm wide. The spunbond base web faced the exterior of the casing. The top side was made outside on the tubing used for stuffing. The top side is the spunbond face or the predominately polymeric side. A standard, commercially available casing was also tested.

All sample tubular casings were soaked in hot water for about 25 minutes before use. The water was uncomfortably hot to the touch. The conventional tubular casing was soaked in hot water for about 40 minutes overall. Four sample tubular casings (one each of 34, 35, 36 and 37) were stuffed along with one conventional tubular casing. The stuffing material was a sausage meat filling. The stuffing was done on commercial stuffing equipment using typical commercial conditions. One end of a tubular casing is tied off by hand, the meat mixture is extruded into the casing and at a suitable time the free end of the tubular casing is tied off by hand.

Sample tubular casings 34 and 35 (acid seamed) split along the seam during stuffing. Sample tubular casings 36 and 37 (stitched seams) survived stuffing as did the conventional casing.

Diameter Dimension Changes

Based on a limited amount of data the standard tubing displayed dry to wet growth of 0% to −1.7% (i.e. shrinkage). On being stuffed the estimated growth in diameter (versus the theoretical diameter calculated from the wet flat width) was 6.2% to 12.2%. These figures illustrate how difficult it is to accurately measure diameter on a freshly stuffed, soft sausage. On cooling the sausage shrank in diameter by about 1.4%.

Sample tubular casings 36 and 37 showed higher growth figures than the conventional tubular casing, going from dry to wet (12-13.4%) and wet to stuffed (10.2-11.9%). So, the overall change from dry to stuffed is 22.2%-25.3%. Shrinkage figures on cooling are 3.3-4.3%.

Example 11

Use of Composite, Reinforced Parchmented Paper as a Casing Material

Tubular sausage casings were prepared from samples of the composite, reinforced parchmented paper previously prepared as sample 19. A feature of the composite, reinforced parchmented paper is that the reinforcement element (i.e., the spunbond base web) is not susceptible to enzymes that attack cellulose. These enzymes grow on cellulose-based casings and weaken the casing structure, making the casing split while it is hanging during drying of the stuffed product and making it difficult to remove the casing in one piece when it is stripped off the stuffed product.

Short lengths of tubular sausage casing samples were seamed by stitching. Two types of seam were prepared. One was an external seam; the other was a flat seam. In the external seam the two edges are brought together and stitched to form a fin that radially projects from the circumference of the tube. In the flat seam one edge overlays the other. The two edges are stitched together to form part of the circumference of the tubing. For each seam type tubular casing samples were made with the spunbond base web facing inside and with the spunbond base web facing outside.

The stuffing was done on commercial stuffing equipment using typical commercial conditions. Equipment in the sausage room consists of a mixer and the stuffer. The boiler is in a separate room. The stuffer can be set to a program and will automatically deliver a set poundage at a set pressure regime reproducibly. For normal fibrous casings this results in a 3 lb. (about 1.4 kg) sausage at about 280 mm length and about 80 mm diameter. Normal stuffing conditions were used for this series of trials. The stuffing material was a sausage meat filling (Haggis).

Sample tubular casings were soaked in lukewarm water for about 10 minutes before use. One of each sample casing variant external seam, base web facing in; external seam, base web facing out; flat seam, base web facing in; flat seam, base web facing out was stuffed. All sample casings survived stuffing, but one sample had an unevenly stitched flat seam that began to pull open during stuffing. This seam did not fail and it survived subsequent boiling. All four of the stuffed casings showed grease penetration at the stitch holes immediately after stuffing. All of the stuffed casings were boiled. Another sample with an external seam almost split adjacent to the seam during boiling.

After retrieval of the stuffed casings (sausages) from the boiler it was very noticeable that the stuffed casings with the spunbond base web adjacent the stuffed meat were leaking grease profusely. The stuffed casings were repeatedly wiped dry but grease would bleed through again very quickly. Stuffed casings with the parchmented cellulose surface adjacent the stuffed meat were much less greasy to the touch. The stuffed casings were allowed to cool and were wiped before being laid on a clean piece of casing paper for 10 minutes. Stuffed casings with the parchmented cellulose phase adjacent the stuffed meat did not leave greasy marks on the paper after 10 minutes, whereas stuffed casings with the spunbond base web adjacent the stuffed meat left greasy marks on the paper after 10 minute. These grease spots tended to be at either end of the stuffed casing.

A stuffed casing grease bleedthrough test was conducted overnight. The stuffed casings were weighed then wrapped in a preweighed piece of casing paper and further wrapped in a polyethylene bag. The bagged, stuffed casings were placed in a refrigerator. After 18 hours the wrapping papers were removed and reweighed. Most wrapping papers had shown a big weight gain, however much of this gain was due to moisture. The wrapping papers were hung in an airstream in a fume hood for an hour to dry off water before being reweighed. Results are reported in % weight gain of the wrapping paper and also in ppm (mg/kg) of grease bleedthrough in 18 hours. This is done by dividing the weight gain of the wrapping paper after air drying by the initial weight of the stuffed casing.

The measured grease bleedthrough for the two stuffed casings with the spunbond base web adjacent the stuffed meat are 334 mg/kg and 509 mg/kg. The measured grease bleedthrough for the two stuffed casings with the parchmented cellulose phase adjacent the stuffed meat are 95 and 161 mg/kg. This is evidence that the best grease barrier is obtained when the parchmented cellulose face is in contact with the meat. In all cases, the majority of the grease bleedthrough occurred at the seam. This could be seen by looking at the residual grease stains on the wrapping papers used in the test. The flat seam was of poorer quality than the external seam. This is reflected in the higher bleedthrough figures for flat seemed stuffed casings.

A sausage comprising a conventional fibrous casing was found to have a grease bleedthrough of 80.2 mg/kg. The sample tubular casing with parchmented cellulose inside and an external sewn seam gave a grease bleedthrough figure comparable to that from a traditional fibrous casing (95 versus 80 mg/kg). If the seam of the composite reinforced parchmented casings can be made more grease tight then the grease bleedthrough performance can be a better match for conventional fibrous casing materials.

Diameter Dimension Changes

No conventional casing materials were included in this trial. In other trials conventional fibrous casings displayed dry to wet growth of 0% to −1.7% (i.e. shrinkage). On being stuffed the estimated growth in diameter (versus the theoretical diameter calculated from the wet flat width) was 6.2% to 12.2%. These figures illustrate how difficult it is to accurately measure diameter on a freshly stuffed, soft sausage. On cooling the sausage shrank in diameter by about 1.4%.

The sample tubular casings formed from composite, reinforced parchmented paper all showed growth figures between 6.0 and 7.5% in going from dry to wet, which is higher than the 0% to −1.7% shown by standard fibrous casings. In going from wet to stuffed the composite reinforced casings grew by 10.9 to 13.0%. This was toward the higher end for growth seen in conventional fibrous casings. On cooling the sample tubular casings had slight growth or shrinkage values of +0.8 to −1.1% as compared to a conventional fibrous casing with a shrinkage of 1.4 to 1.6%.

Appearance

Whether the polymer base sheet side is inside or outside has a dramatic effect upon the appearance of the sausage. In samples with the parchmented cellulose adjacent the meat and the spunbond base sheet is facing the exterior the diamond calendar pattern of the spunbond base sheet can be seen quite strongly and the appearance is quite textile like. This is the orientation that would provide a better grease barrier. In samples with the spunbond base web adjacent the meat and the parchmented cellulose facing the exterior the diamond calendar pattern is not so heavy the final sausage looks more transparent i.e. more like a traditional fibrous casing or a clear plastic casing.

By choosing a different bonding pattern for the spunbond base web it is possible to generate a different surface appearance in the composite reinforced parchmented paper. Further differences in surface appearance can be provided by using an apertured hydroentangling wire. Coloring of the composite, reinforced parchmented paper is also possible.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A method of forming a layered precipitated nonwoven product comprising:
   a) forming a nonwoven base sheet of at least non-cellulose fibers by depositing thermoplastic filaments on a moving forming surface to form a spunlaid batt of filaments, and bonding the thus deposited thermoplastic filaments by thermal point bonding or by air bonding to form the base sheet,
   b) applying a material sensitive to a gelatinizing agent on the base sheet,
   c) associating the base sheet and the material together to form a composite sheet,
   d) forming a gelatinized sheet by treating before or during step c) one of (i) the base sheet on which the material sensitive to the gelatinizing agent is applied, (ii) the material sensitive to the gelatinizing agent, and (iii) the composite sheet with a gelatinizing agent to partially dissolve the material sensitive to the gelatinizing agent,
   e) washing the gelatinized sheet to remove gelatinizing agent and to regenerate and to precipitate the material dissolved/gelatinized in step d), and
   f) drying the product.

2. The method of claim 1, wherein the material sensitive to a gelatinizing agent is a fibrous material.

3. The method of claim 2, wherein the fibrous material sensitive to a gelatinizing agent is one or more of cellulose, chitosan, rayon, nylon, and polylactic acid (PLA).

4. The method of claim 2, wherein step c) is practiced by associating the fibrous material sensitive to a gelatinizing agent with the base sheet by wet pressing or by entangling.

5. The method of claim 2, wherein the gelatinizing agent is one or more of aqueous solutions of alkalis, acids, acid salts and PLA solvent.

6. The method of claim 5, wherein the gelatinizing agent is one or more of aqueous solutions of caustic soda, sulfuric acid, phosphoric acid, nitric acid, formic acid, acetic acid, acid salt of zinc, acid salt of tin, acid salt of antimony, acid salt of aluminum, zinc chloride, and PLA solvent.

7. The method of claim 1, wherein the material sensitive to a gelatinizing agent is a non-fibrous film.

8. The method of claim 7, wherein the material sensitive to a gelatinizing agent is a cellulose film, a nylon film, or a cellophane film.

9. The method of claim 1, comprising the step of using the dissolved material for bonding at least some of the fibers of the base sheet.

10. The method of claim 1, wherein the nonwoven base sheet formed in step a) also comprises material sensitive to a gelatinizing agent in addition to non-cellulose fibers.

11. The method of claim 10, wherein the nonwoven base sheet formed in step a) comprises cellulose fibers, nylon, or cellophane in addition to non-cellulose fibers.

12. The method of claim 1, comprising the step of deriving the non-cellulose fibers from at least one of glass, carbon, polyethylene terephthalate (PET), a mixture of polyethylene terephthalate polymers with similar or modified chemistries polylactic acid (PLA), other polyesters such as polybutylene terephthalate (PBT) and poly trimethylene terephthalate (PTT), polypropylene (PP), polyethylene (PE), polyamide, copolymers of any of these polymers, mixtures of any of these polymers, and chitosan.

13. The method of claim 1, comprising the step of forming the base sheet of continuous or staple length thermoplastic fibers and cellulose fibers.

14. The method of claim 1, wherein step b) is practiced by applying the material sensitive to a gelatinizing agent on the base sheet as a pre-formed web or tissue or sheet or by means of a wet-laying or an air-laying process.

15. The method of claim 14, wherein the material sensitive to a gelatinizing agent is fibrous material.

16. The method of claim 15, wherein the material sensitive to a gelatinizing agent is cellulose fibers.

17. The method of claim 1, comprising the step of overlaying additional sheets to the composite sheet to form a composite precipitated product having additional layers.

18. The method of claim 1, comprising the step of forming at least one of the sheets at least partially of filaments extending substantially continuously in the machine direction.

19. The method of claim 1, comprising the step of positioning the sheets one over the other either before, during or after the treatment with a gelatinizing agent.

20. The method of claim 1, comprising the step of associating the sheets to each other by the gelatinizing agent to form a layered precipitated product.

21. The method of claim 1, comprising the step of treating the base sheet or base sheet composite with a plasticizing agent.

22. The method of claim 1, comprising the steps of cutting the gelatinized sheet into strips, folding the strips to form tubes, and fastening the sides of the strips to form a seam.

23. A method of forming a layered precipitated tubular nonwoven product comprising:
   a) forming a nonwoven base sheet of at least non-cellulose fibers by depositing thermoplastic filaments on a moving forming surface to form a spunlaid batt of filaments, and bonding the thus deposited filaments by thermal point bonding or by air bonding to form the base sheet,
   b) applying on the base sheet material sensitive to a gelatinizing agent,
   c) associating the base sheet and the material together to form a composite sheet,
   d) forming the composite sheet into a tube,
   e) joining the edges thereof,
   f) treating the composite sheet before steps d) and e) or the tube after step e) with a gelatinizing agent to partially dissolve the material sensitive to gelatinizing agent so as to leave a layer of material treated by the gelatinizing agent on the composite sheet or on the tube,
   g) washing the tube to remove gelatinizing agent and to regenerate and to precipitate the material dissolved/gelatinized in step f), and
   h) drying the product.

24. A method of forming a layered precipitated nonwoven product comprising:
   a) forming a nonwoven base sheet of at least non-cellulose fibers by depositing thermoplastic filaments on a moving forming surface to form a spunlaid batt of filaments, and bonding the thus deposited filaments by thermal point bonding or by air bonding to form the base sheet,
   b) applying on the base sheet material sensitive to a gelatinizing agent,
   c) associating said base sheet and said material together to form a composite sheet,
   d) before or during step c), treating one of (i) the base sheet on which the material sensitive to the gelatinizing agent is applied, (ii) the material sensitive to the gelatinizing agent, and (iii) the composite sheet with a gelatinizing agent to partially dissolve the material sensitive to the gelatinizing agent so as to leave a layer of material treated by the gelatinizing agent on the base sheet, to form a layered gelatinized sheet,
   e) washing the layered gelatinized sheet to remove gelatinizing agent and to regenerate and to precipitate the material dissolved/gelatinized in step d), and
   f) drying the product.

* * * * *